United States Patent
Abe

(10) Patent No.: US 8,644,566 B2
(45) Date of Patent: Feb. 4, 2014

(54) BIOMETRIC AUTHENTICATION DEVICE AND BIOMETRIC AUTHENTICATION METHOD

(75) Inventor: Narishige Abe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 209 days.

(21) Appl. No.: 13/241,608

(22) Filed: Sep. 23, 2011

(65) Prior Publication Data

US 2012/0014570 A1  Jan. 19, 2012

Related U.S. Application Data

(63) Continuation of application No. PCT/JP2009/057465, filed on Apr. 13, 2009.

(51) Int. Cl.
*G06K 9/00* (2006.01)
(52) U.S. Cl.
USPC .......................................................... 382/124
(58) Field of Classification Search
None
See application file for complete search history.

(56) References Cited

U.S. PATENT DOCUMENTS

| | | | |
|---|---|---|---|
| 6,845,173 B2 * | 1/2005 | Takahashi | 382/124 |
| 6,961,452 B2 * | 11/2005 | Fujii | 382/125 |
| 7,539,330 B2 * | 5/2009 | Rowe | 382/124 |
| 2005/0100200 A1 | 5/2005 | Abiko et al. | |
| 2005/0105782 A1 | 5/2005 | Abiko | |
| 2007/0189586 A1 | 8/2007 | Monden | |

FOREIGN PATENT DOCUMENTS

| | | |
|---|---|---|
| JP | 63-138477 | 6/1988 |
| JP | 2002-177624 | 6/2002 |
| JP | 2005-143890 | 6/2005 |
| JP | 2005-149351 | 6/2005 |
| JP | 2007-4823 | 1/2007 |
| WO | 2004/026139 A1 | 4/2004 |
| WO | 2005/086091 A1 | 9/2009 |

OTHER PUBLICATIONS

International Search Report for PCT/JP2009/057465, mailed May 19, 2009.
Office Action issued May 3, 2013 in corresponding Chinese Patent Application No. 200980158686.4.

* cited by examiner

*Primary Examiner* — Samir Ahmed
(74) *Attorney, Agent, or Firm* — Staas & Halsey LLP

(57) ABSTRACT

A biometric authentication device includes: a biometric information acquiring unit which acquires a user's biometric information and generates a biometric image representing the biometric information; a storage unit which stores data concerning registered biometric information of at least one registered user; and a processing unit. The processing unit detects from the biometric image a moderately blurred region having a first degree of blurring and a highly blurred region having a second degree of blurring which is higher than the first degree of blurring, identifies the cause of the occurrence of the highly blurred region and the moderately blurred region, and presents to the user a warning message corresponding to the cause of the occurrence of the blurred regions.

8 Claims, 11 Drawing Sheets

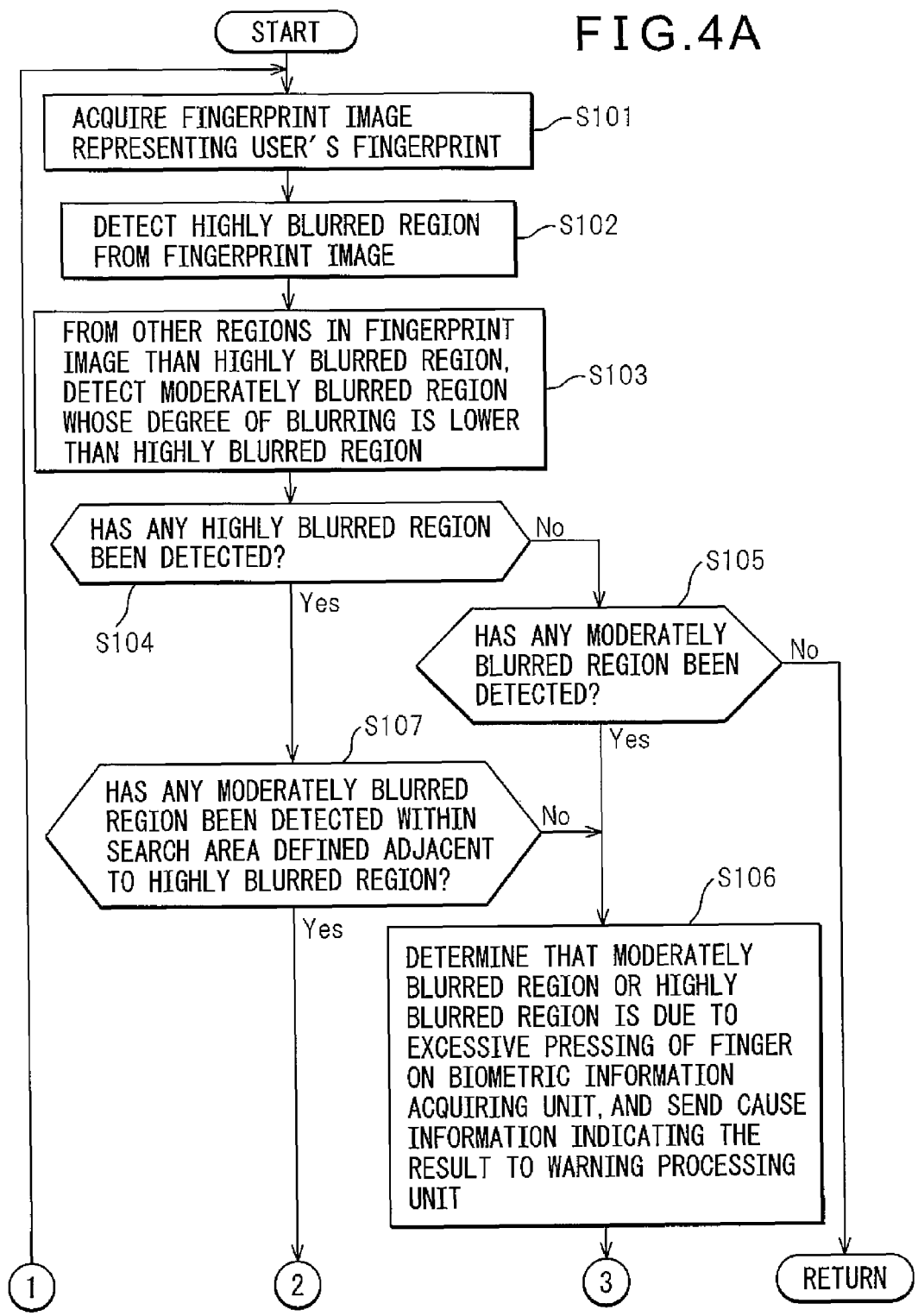

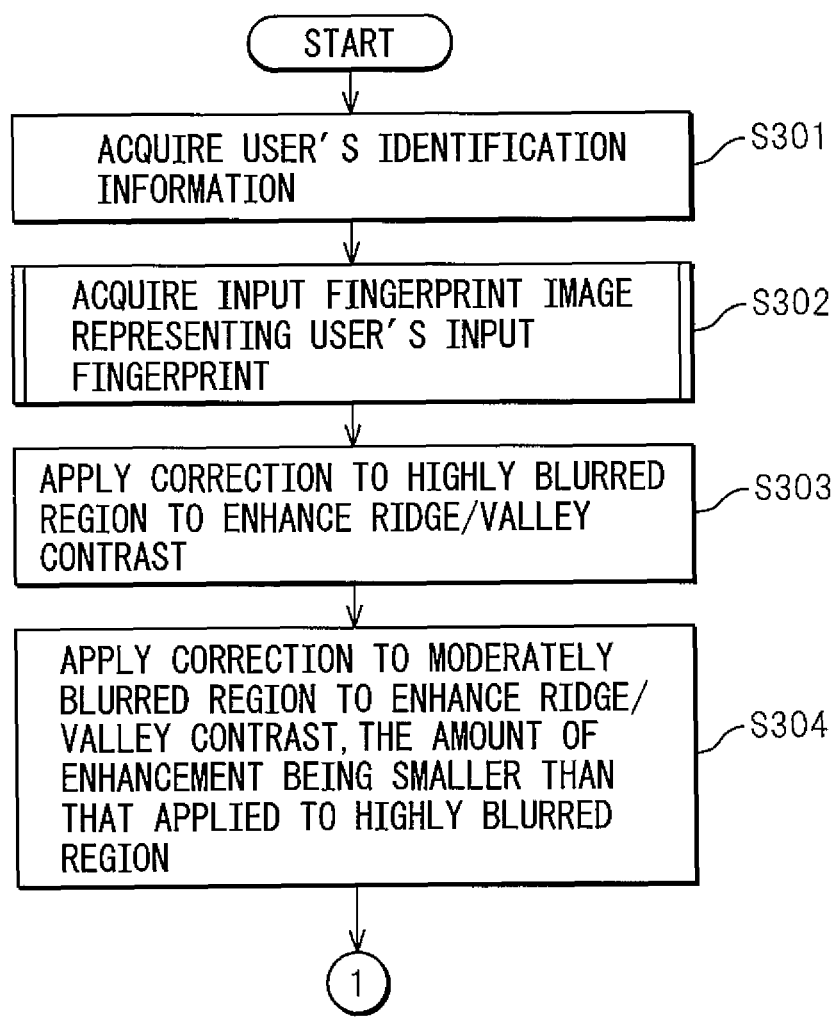

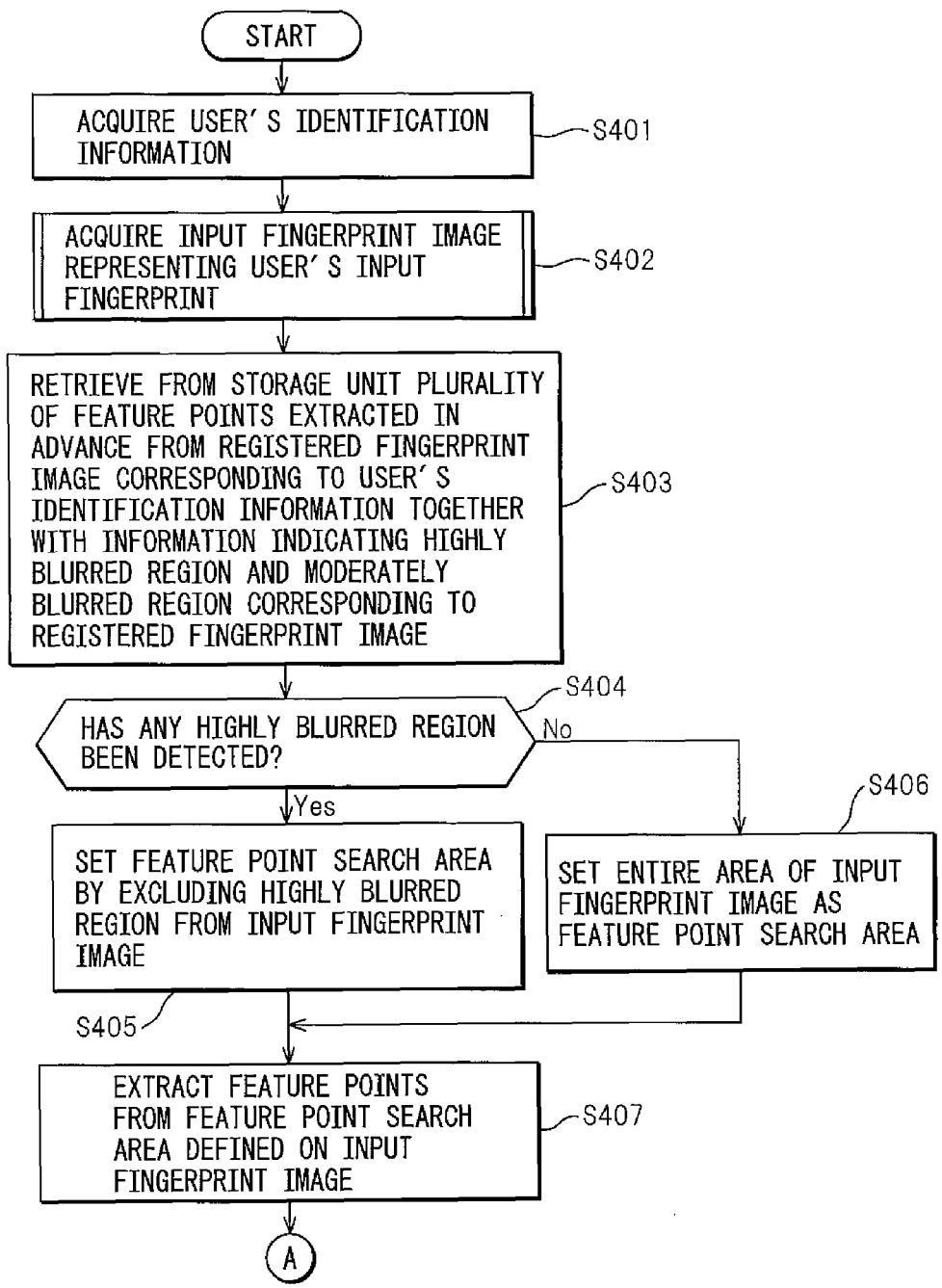

BIOMETRIC AUTHENTICATION DEVICE AND BIOMETRIC AUTHENTICATION METHOD

CROSS-REFERENCE TO RELATED APPLICATION

This application is a continuation application and is based upon PCT/JP2009/57465, filed on Apr. 13, 2009, the entire contents of which are incorporated herein by reference.

FIELD

The embodiments disclosed herein are also related to a biometric authentication device for authenticating a subject as being genuine or not by comparing biometric information represented in a biometric image against preregistered biometric information, and to a biometric authentication method and a computer program for biometric authentication.

BACKGROUND

Recent years have seen the development of biometric authentication techniques for authenticating a user of an apparatus or system by utilizing a biometric image representing the user's biometric information such as a fingerprint or a palm print. A biometric authentication device using such biometric authentication techniques acquires, as an input biometric image, a biometric image representing, for example, the biometric information of the user who is to use the biometric authentication device. Then, the biometric authentication device compares the user's input biometric information represented in the input biometric image against registered biometric information of preregistered users represented in registered images. If it is determined as a result of the comparison that the input biometric information matches the registered biometric information, the biometric authentication device authenticates the user as being a legitimate registered user. Then, the biometric authentication device permits the thus authenticated user to use the biometric authentication device or some other device connected to the biometric authentication device.

In the use of such biometric authentication techniques, it is desirable that the characteristic features of the biometric information be clearly captured in the input biometric image as well as the registered biometric image in order for the user to be authenticated with high accuracy. However, depending on the condition of the input biometric information or on the operation performed by the user on the device for entering the biometric information, a locally or globally blurred input biometric image or registered biometric image may result.

For example, when the biometric authentication device acquires a fingerprint image of a particular finger of the user as the biometric image representing the biometric information, if the surface of that particular finger is moistened with sweat, a fingerprint image containing a blurred region with the sweat building up between the ridges of the finger will be captured by the biometric authentication device. Further, if the user presses the finger too hard onto the fingerprint sensor, the height of the ridges relative to the valleys is reduced in the pressed portion; in this case also, a fingerprint image containing a blurred region will be captured by the biometric authentication device. Since the biometric authentication device extracts, for example, the end points or branch points of the ridges as the feature points for matching, it is difficult to accurately extract the feature points from such a blurred region. As a result, in such a blurred region, the biometric authentication device becomes unable to accurately examine the degree of matching between the feature points of the input fingerprint image and the feature points of the preregistered fingerprint image, and the accuracy of matching thus degrades. In view of this, techniques have been developed that detect such a blurred region from the image representing the input biometric information or correct such a blurred region.

For example, patent document 1 discloses an authentication device which successively samples a plurality of sub-images by an image sampling means from a subject that is moving relative to the image sampling means. Then, the authentication device removes images of non-moving patterns contained in the plurality of sub-images, thereby removing from the sub-images such images as sebum, sweat, vapor, etc., adhering to the sensor surface.

Patent document 2 discloses a striped pattern extraction system which extracts from an image a predetermined number of local direction angles of the line segments forming the striped pattern and computes the reliability evaluation value of each of the extracted direction angles. Then, the striped pattern extraction system suppresses the reliability evaluation value for any pixel for which the number of parallel lines is not larger than a prescribed condition, thereby making it possible to correct blurred ridges due to streaks, solid shading, etc.

Patent document 3 discloses a finger/palm print image processing system which divides the finger/palm print image into a plurality of sub-regions and applies a frequency transform to each sub-region to obtain a plurality of frequency components representing the sub-region. Then, the finger/palm print image processing system determines whether the sub-region is a region that contains a fine structure by checking whether there is any difference between the frequency-transformed result of the center portion of the sub-region and the frequency-transformed result of the sub-region including its peripheral portion. The finger/palm print image processing system can thus correctly identify the finger/palm print region even when the finger/palm print region contains a blurred portion.

Patent document 4 discloses an input fingerprint condition identifying device which determines whether a fingerprint formed from ridges and valleys exists in each of the regions into which the input fingerprint image has been split and identifies the skin surface condition in each split region. In particular, for each split region, the input fingerprint condition identifying device determines whether the split region is in a moistened condition or in a dry condition, based on the proportion of pixels representing ridges and the proportion of pixels representing valleys or background. Then, the input fingerprint condition identifying device identifies the fingerprint condition, based on such parameters as the proportions of the moistened regions and the dry regions to the entire area.

Patent document 1: International Publication Pamphlet No. WO2004-26139

Patent document 2: Japanese Laid-open Patent Publication No. 2005-10842

Patent document 3: International Publication Pamphlet No. WO2005-86091

Patent document 4: Japanese Laid-open Patent Publication No. 2002-298126

SUMMARY

As described above, there is more than one cause that contributes to the occurrence of a blurred region in the image representing the biometric information. If the cause is different, the feature of the blurred region can also be different. For example, if the cause is the adhesion of a liquid such as sweat on the finger surface, the degree of blurring differs even within one blurred region, depending on the thickness of the liquid layer. On the other hand, if the cause is the excessive pressing of the finger on the fingerprint sensor, the degree of blurring is relatively uniform because only the excessively pressed region is blurred.

However, none of the above prior art techniques is able to identify which of the causes is the blurred region. As a result, none of the biometric authentication devices employing the above prior art techniques has been able to take a countermeasure appropriate to the cause of the blurred region.

According to one embodiment, there is provided a biometric information registration device. The biometric information registration device includes: a biometric information acquiring unit which acquires a user's biometric information and generates a biometric image representing the biometric information; an input unit which acquires the user's identification information; a storage unit; and a processing unit. The processing unit implements: a moderately blurred region detection function which detects from the biometric image a moderately blurred region having a first degree of blurring; a highly blurred region detection function which detects from the biometric image a highly blurred region having a second degree of blurring which is higher than the first degree of blurring; a blurring cause identifying function which, when the highly blurred region is detected and when the moderately blurred region is detected within a search area defined adjacent to the highly blurred region, then determines that the highly blurred region and the moderately blurred region have occurred due to a first cause and which, when the highly blurred region is detected and when the moderately blurred region is detected outside the search area, or when only one or the other of the highly blurred region and the moderately blurred region is detected, then determines that the highly blurred region or the moderately blurred region has occurred due to a second cause which is different from the first cause; a warning processing function which presents to the user a warning message which is different between the first cause and the second cause; and a registration processing function which, when at least one or the other of the highly blurred region and the moderately blurred region is detected from the biometric image initially acquired, then stores data concerning the user's biometric information represented in the biometric image into the storage unit by associating the data with the user's identification information after the biometric image has been regenerated by the biometric information acquiring unit reacquiring the user's biometric information in response to the warning message.

According to another embodiment, there is provided a biometric authentication device. The biometric authentication device includes: a biometric information acquiring unit which acquires a user's input biometric information and generates an input biometric image representing the input biometric information; a storage unit which stores data concerning registered biometric information of at least one registered user that is preregistered; and a processing unit. The processing unit implements: a moderately blurred region detection function which detects from the input biometric image a moderately blurred region having a first degree of blurring; a highly blurred region detection function which detects from the input biometric image a highly blurred region having a second degree of blurring which is higher than the first degree of blurring; a blurring cause identifying function which, when the highly blurred region is detected and when the moderately blurred region is detected within a search area defined adjacent to the highly blurred region, then determines that the highly blurred region and the moderately blurred region have occurred due to a first cause and which, when the highly blurred region is detected and when the moderately blurred region is detected outside the search area, or when only one or the other of the highly blurred region and the moderately blurred region is detected, then determines that the highly blurred region or the moderately blurred region has occurred due to a second cause which is different from the first cause; a warning processing function which presents to the user a warning message which is different between the first cause and the second cause; and a matching function which, when at least one or the other of the highly blurred region and the moderately blurred region is detected from the input biometric image initially acquired, then matches the input biometric information represented in the input biometric image against the registered biometric information after the input biometric image has been regenerated by the biometric information acquiring unit reacquiring the user's biometric information in response to the warning message.

According to still another embodiment, there is provided, for use in a device including a biometric information acquiring unit which acquires a user's biometric information and generates a biometric image representing the biometric information, an input unit which acquires the user's identification information, a storage unit, and a processing unit, a computer program for causing the device to register the biometric information. The computer program includes instructions for causing the processing unit to execute: detecting from the biometric image a moderately blurred region having a first degree of blurring; detecting from the biometric image a highly blurred region having a second degree of blurring which is higher than the first degree of blurring; when the highly blurred region is detected and when the moderately blurred region is detected within a search area defined adjacent to the highly blurred region, then determining that the highly blurred region and the moderately blurred region have occurred due to a first cause, while on the other hand, when the highly blurred region is detected and when the moderately blurred region is detected outside the search area, or when only one or the other of the highly blurred region and the moderately blurred region is detected, then determining that the highly blurred region or the moderately blurred region has occurred due to a second cause which is different from the first cause; presenting to the user a warning message which is different between the first cause and the second cause; and when at least one or the other of the highly blurred region and the moderately blurred region is detected from the biometric image initially acquired, then storing data concerning the user's biometric information represented in the biometric image into the storage unit by associating the data with the user's identification information after the biometric image has been regenerated by the biometric information acquiring unit reacquiring the user's biometric information in response to the warning message.

According to yet another embodiment, there is provided, for use in a device including a biometric information acquiring unit which acquires a user's input biometric information and generates an input biometric image representing the input biometric information, a storage unit which stores data concerning registered biometric information of a registered user, and a processing unit, a computer program for causing the device to perform biometric authentication using the input biometric information and the registered biometric information. The computer program includes instructions for causing the processing unit to execute: detecting from the input biometric image a moderately blurred region having a first degree of blurring; detecting from the input biometric image a highly blurred region having a second degree of blurring which is higher than the first degree of blurring; when the highly blurred region is detected and when the moderately blurred region is detected within a search area defined adjacent to the highly blurred region, then determining that the highly blurred region and the moderately blurred region have occurred due to a first cause, while on the other hand, when the highly blurred region is detected and when the moderately blurred region is detected outside the search area, or when only one or the other of the highly blurred region and the moderately blurred region is detected, then determining that the highly blurred region or the moderately blurred region has occurred due to a second cause which is different from the first cause; presenting to the user a warning message which is different between the first cause and the second cause; and when at least one or the other of the highly blurred region and the moderately blurred region is detected from the input biometric image initially acquired, then matching the input biometric information represented in the input biometric image against the registered biometric information after the input biometric image has been regenerated by the biometric information acquiring unit reacquiring the user's biometric information in response to the warning message.

According to a further embodiment, there is provided, for use in a device including a biometric information acquiring unit which acquires a user's biometric information and generates a biometric image representing the biometric information, an input unit which acquires the user's identification information, and a storage unit, a biometric information registration method for registering the biometric information. The biometric information registration method includes: detecting from the biometric image a moderately blurred region having a first degree of blurring; detecting from the biometric image a highly blurred region having a second degree of blurring which is higher than the first degree of blurring; when the highly blurred region is detected and when the moderately blurred region is detected within a search area defined adjacent to the highly blurred region, then determining that the highly blurred region and the moderately blurred region have occurred due to a first cause, while on the other hand, when the highly blurred region is detected and when the moderately blurred region is detected outside the search area, or when only one or the other of the highly blurred region and the moderately blurred region is detected, then determining that the highly blurred region or the moderately blurred region has occurred due to a second cause which is different from the first cause; presenting to the user a warning message which is different between the first cause and the second cause; and when at least one or the other of the highly blurred region and the moderately blurred region is detected from the biometric image initially acquired, then storing data concerning the user's biometric information represented in the biometric image into the storage unit by associating the data with the user's identification information after the biometric image has been regenerated by the biometric information acquiring unit reacquiring the user's biometric information in response to the warning message.

According to a still further embodiment, there is provided, for use in a device including a biometric information acquiring unit which acquires a user's input biometric information and generates an input biometric image representing the input biometric information and a storage unit which stores data concerning registered biometric information of a registered user, a biometric authentication method for performing biometric authentication using the input biometric information and the registered biometric information. The biometric authentication method includes: detecting from the input biometric image a moderately blurred region having a first degree of blurring; detecting from the input biometric image a highly blurred region having a second degree of blurring which is higher than the first degree of blurring; when the highly blurred region is detected and when the moderately blurred region is detected within a search area defined adjacent to the highly blurred region, then determining that the highly blurred region and the moderately blurred region have occurred due to a first cause, while on the other hand, when the highly blurred region is detected and when the moderately blurred region is detected outside the search area, or when only one or the other of the highly blurred region and the moderately blurred region is detected, then determining that the highly blurred region or the moderately blurred region has occurred due to a second cause which is different from the first cause; presenting to the user a warning message which is different between the first cause and the second cause; and when at least one or the other of the highly blurred region and the moderately blurred region is detected from the input biometric image initially acquired, then matching the input biometric information represented in the input biometric image against the registered biometric information after the input biometric image has been regenerated by the biometric information acquiring unit reacquiring the user's biometric information in response to the warning message.

The object and advantages of the invention will be realized and attained by means of the elements and combinations particularly pointed out in the claims. It is to be understood that both the foregoing general description and the following detailed description are exemplary and explanatory only, and are not restrictive of the invention as claimed.

BRIEF DESCRIPTION OF THE DRAWINGS

FIG. 4A is an operation flowchart of a fingerprint image input process which is controlled by a computer program executed on the processing unit according to the one embodiment.

FIG. 6A is an operation flowchart of a biometric authentication process which is controlled by a computer program executed on the processing unit.

FIG. 7 is an operation flowchart of an alternative example of the biometric authentication process which is controlled by a computer program executed on the processing unit.

DESCRIPTION OF EMBODIMENTS

A computer for carrying out a biometric authentication process according to one embodiment will be described below with reference to the drawings.

The computer according to the one embodiment acquires the user's biometric information as input biometric information when the user wishing to use the computer logs in to the computer. The computer then compares the input biometric information with the registered biometric information of the registered user identified, from among the registered users preregistered in the computer, by the identification information entered by the user. If it is determined as a result of the comparison that the input biometric information matches the registered biometric information, the computer authenticates the user as being a legitimate registered user. Then, the computer permits the thus authenticated user to log in to the computer.

The computer acquires the user's biometric information by using a contact-type sensor. When an input biometric image representing the input biometric information or a registered biometric image representing the registered biometric information is acquired, the computer detects a blurred region which may be contained in the input biometric image or the registered biometric image. At this time, the computer identifies the cause for the occurrence of the blurred region in the fingerprint image by noting that the feature of the blurred region differs according to the cause.

In the present embodiment, the computer uses a fingerprint as the biometric information for biometric authentication. However, other kinds of biometric information, such as a palm print, a nose print, etc., that can be acquired from the surface of a human body by a contact-type sensor, may be used as the biometric information for biometric authentication.

In this specification, the term "matching process" is used to refer to the process for computing the degree of similarity between the input biometric information and the registered biometric information. Further, the term "biometric authentication process" is used to refer not only to the matching process but also to the entire authentication process including the process for determining whether the user is an authenticated user or not by using the degree of similarity obtained in the matching process.

Figure 1:
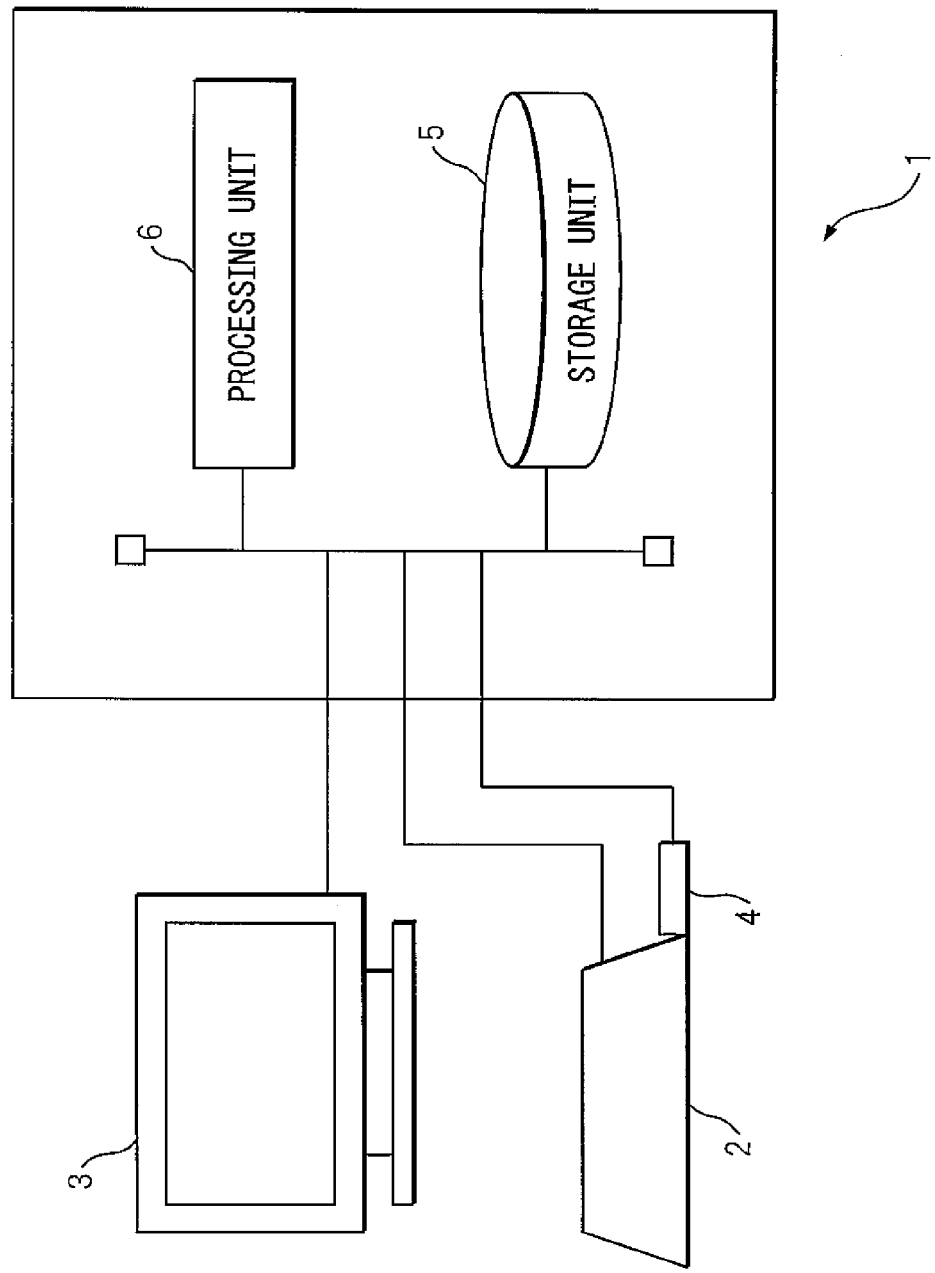
FIG. 1 is a diagram illustrating in simplified form the configuration of a computer for carrying out a biometric authentication process according to one embodiment.

FIG. 1 is a diagram illustrating in simplified form the configuration of the computer for carrying out the biometric authentication process. As illustrated in FIG. 1, the computer 1 includes an input unit 2, a display unit 3, a biometric information acquiring unit 4, a storage unit 5, and a processing unit 6. When the user logs in to the computer 1, the computer 1 performs the biometric authentication process by using a fingerprint image that represents the user's fingerprint. When the user is authenticated as being one of the registered users preregistered in the computer 1 as a result of the biometric authentication, the computer 1 performs a login process. The computer 1 permits the thus authenticated user to use the computer 1.

The input unit 2 includes, for example, an input device such as a keyboard, a mouse, or a touchpad. The input unit 2 is used for the user to enter a command, data, etc. The input unit 2 also functions as an identification information input unit for entering user identification information into the computer 1. The user identification information may be, for example, a character string containing alphanumeric characters or symbols or the name of the user. The command, data, or user identification information entered via the input unit 2 is passed to the processing unit 6.

The display unit 3 includes a display device such as a liquid crystal display or a CRT monitor. The display unit 3 displays the command, data, or user identification information entered via the input unit 2 into the computer 1 or various kinds of information associated with the application executed by the processing unit 6.

When registering a legitimate user in the computer 1, the biometric information acquiring unit 4 generates a registered fingerprint image representing the fingerprint of that user by reference to which the biometric authentication is performed. Further, when a user logs in to the computer 1, the biometric information acquiring unit 4 generates an input fingerprint image representing the fingerprint of that user. For this purpose, the biometric information acquiring unit 4 includes, for example, a sweep-type fingerprint sensor. This fingerprint sensor may be a sensor that employs, for example, an optical type, a capacitive type, an electric field type, or a heat-sensitive type. Alternatively, the biometric information acquiring unit 4 may include a contact-type fingerprint sensor of any suitable type that uses an area sensor. The biometric information acquiring unit 4 passes the generated fingerprint image to the processing unit 6.

The input unit 2 and the biometric information acquiring unit 4 may be combined into a single unit.

When the user makes a login request by operating the input unit 2, the computer 1 causes the display unit 3 to display, for example, a message prompting the user to enter the user's identification information and a message prompting the user to place his finger on the biometric information acquiring unit 4.

When the user's input fingerprint image is acquired via the biometric information acquiring unit 4, the computer 1 associates the input fingerprint image with the user's identification information entered from the input unit 2. On the other hand, when the user makes a registration request to the computer 1 by operating the input unit 2, the computer 1 causes the display unit 3 to display, for example, a message prompting the user to enter the user's identification information and a message prompting the user to place his finger on the biometric information acquiring unit 4. When the user's registered fingerprint image is acquired via the biometric information acquiring unit 4, the computer 1 associates the registered fingerprint image with the user's identification information entered from the input unit 2.

The storage unit 5 includes at least one device selected, for example, from among a semiconductor memory device, a magnetic disk device, and an optical disk device. The storage unit 5 stores an application program to be used in the computer 1, the identification information and personal setting information of at least one registered user, and various kinds of data, etc. The storage unit 5 further stores a program for carrying out the biometric authentication process. Furthermore, the storage unit 5 stores, for each registered user, data concerning the fingerprint of a designated finger of the registered user. The data concerning the fingerprint may be the matching feature amount extracted from the registered fingerprint image, or the registered fingerprint image itself or a sub-region thereof. Alternatively, the data concerning the fingerprint may contain both the matching feature amount and the whole or part of the registered fingerprint image. The sub-region of the registered fingerprint image may be taken, for example, from a region, such as a region near the center of the fingerprint pattern, that is unique to each individual person.

The storage unit 5 may further store information concerning a blurred region for each registered fingerprint image.

The storage unit 5 further stores a warning message that is presented to the user when a blurred region is detected.

The processing unit 6 includes one or a plurality of processors and their peripheral circuitry. The processing unit 6 executes commands entered via the input unit 2 or various kinds of applications. The processing unit 6 further performs processing such as the login/logout of the user to the computer 1, the registration of the user, etc. When a login request is made to the computer 1 by the user via the input unit 2, the processing unit 6 carries out the biometric authentication process by using the input fingerprint image, representing the user's fingerprint, acquired via the biometric information acquiring unit 4. On the other hand, when a registration request is made to the computer 1 by the user via the input unit 2, the processing unit 6 acquires the user's fingerprint image via the biometric information acquiring unit 4 and sets it as the registered fingerprint image. Then, the processing unit 6 extracts the feature amount from the registered fingerprint image and stores the extracted feature amount in the storage unit 5.

When the input fingerprint image or the registered fingerprint image is acquired, if the finger surface is moistened with perspiration or the like, the contrast between the ridges and valleys of the finger becomes blurred in the portion of the input fingerprint image or the registered fingerprint image that corresponds to the moistened finger portion. Further, if the user presses his finger too tightly on the biometric information acquiring unit 4, the height of the ridges relative to the valleys is reduced. As a result, the contrast between the ridges and valleys of the finger becomes blurred in the portion of the input fingerprint image or the registered fingerprint image that corresponds to the portion where the user has pressed his finger too tightly on the biometric information acquiring unit 4. Furthermore, when the finger surface is soft, the contrast between the ridges and valleys of the finger also becomes blurred in the portion of the input fingerprint image or the registered fingerprint image that corresponds to the soft portion, as in the case where the finger is pressed too tightly.

The presence of such a poor contrast region can cause a degradation of matching accuracy. Further, the degree of blurring changes depending on the cause of the poor contrast.

Figure 2:
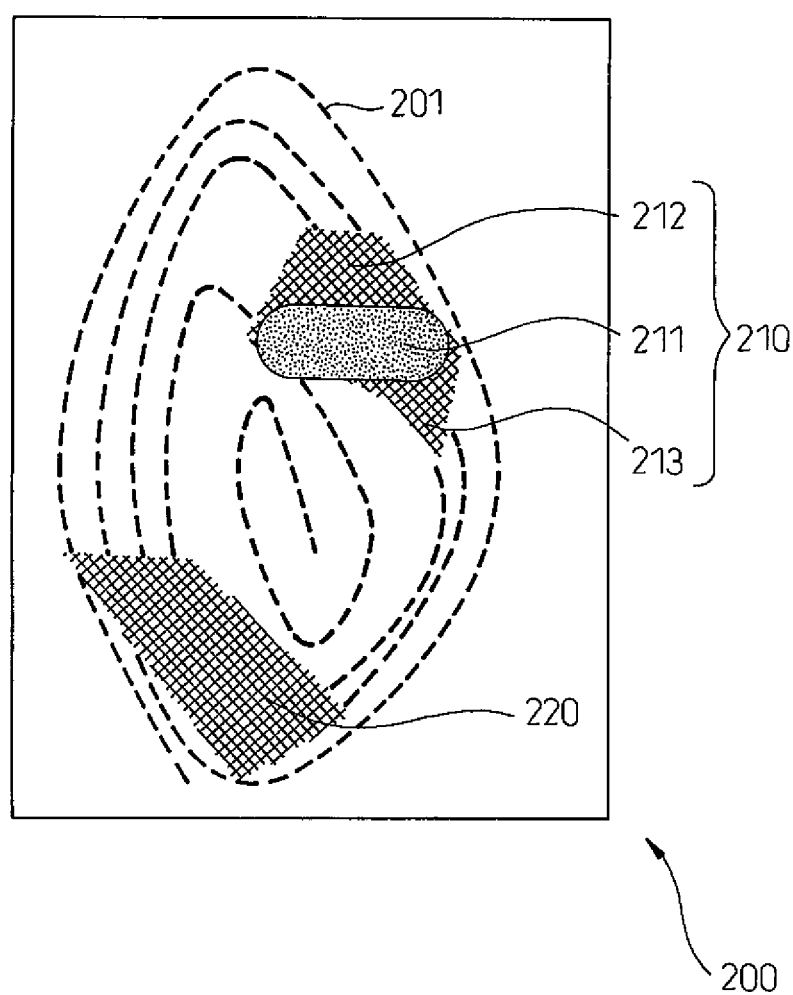
FIG. 2 is a schematic diagram of a fingerprint image containing blurred regions.

FIG. 2 is a schematic diagram of a fingerprint image containing blurred regions. In the fingerprint image 200 depicted in FIG. 2, dashed lines 201 represent ridges. Further, region 210 is a region where the contrast between the ridges and valleys of the finger is blurred because the finger surface is moistened. The region 210 includes a main region 211 located in the center and two sub-regions 212 and 213 adjacent to the main region 211 along the direction in which the finger is moved relative to the biometric information acquiring unit 4 when acquiring the fingerprint image. The main region 211 is formed because of a relatively large amount of liquid adhering to the finger surface portion corresponding to the main region 211. The degree of blurring of the main region 211 is therefore high. On the other hand, the two sub-regions 212 and 213 each correspond to a region into which the liquid adhering to the finger surface portion corresponding to the main region 211 has spread. As a result, the amount of liquid adhering to the finger surface portion corresponding to the sub-regions 212 and 213 is generally smaller than the amount of liquid adhering to the finger surface portion corresponding to the main region 211. The degree of blurring of the sub-regions 212 and 213 is therefore lower than the degree of blurring of the main region 211.

Further, since the liquid spreads differently because the thickest part of the fingertip is not flat or because the force applied to the finger when the user slides his finger is not constant, the amount of liquid adhering to the finger surface portion differs from place to place. For such reasons also, the sub-regions 212 and 213 whose degree of blurring is lower than that of the main region 211 are formed around the main region 211.

On the other hand, region 220 is a region where the contrast between the ridges and valleys of the finger is blurred because the user has pressed his finger too tightly on the biometric information acquiring unit 4. Since, in this region 220, only the portion where the finger is pressed too tightly is blurred, the degree of blurring is uniform across the region 220, compared with that of the region 210. Further, the degree of blurring of the region 220 varies depending on the amount of pressure with which the finger is pressed. As a result, if the amount of pressure is small, the degree of blurring of the region 220 becomes lower than the degree of blurring of the main region 211. The feature of a region that becomes blurred due to the softness of the finger surface is similar to that of the region 220.

In view of the above, the processing unit 6 conjectures the cause for the occurrence of the blurred region according to the feature of the blurred region contained in the input biometric image or the registered biometric image. Then, the processing unit 6 presents a warning message indicating the cause to the user and prompts the user to have his fingerprint rescanned by the biometric information acquiring unit 4.

Figure 3:
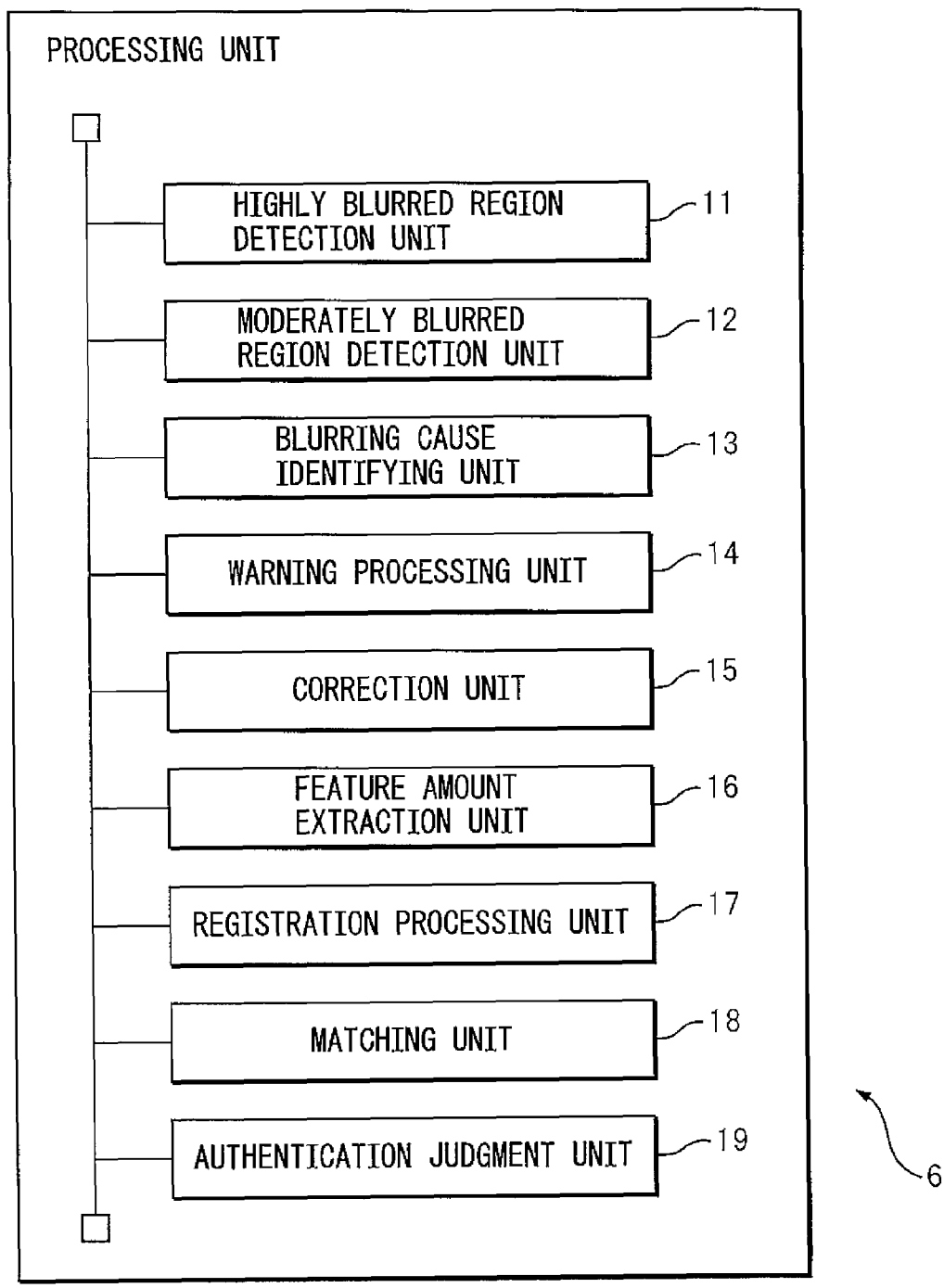
FIG. 3 is a functional block diagram of a processing unit in the computer according to the one embodiment, illustrating the functions implemented to perform the biometric authentication for the authentication of a user.

FIG. 3 is a functional block diagram of the processing unit 6, illustrating the functions implemented to perform the biometric authentication and fingerprint image registration for the authentication and registration of a user. As illustrated in FIG. 3, the processing unit includes a highly blurred region detection unit 11, a moderately blurred region detection unit 12, a blurring cause identifying unit 13, a warning processing unit 14, a correction unit 15, a feature amount extraction unit 16, a registration processing unit 17, a matching unit 18, and an authentication judgment unit 19. These units constituting the processing unit 6 are functional modules implemented by executing a computer program on the processor incorporated in the processing unit 6. Alternatively, these units constituting the processing unit 6 may be implemented in firmware running on the computer 1. The processing unit 6 may further include a module for carrying out the login or logout process and a module for executing various kinds of applications. However, since the modules, such as the module for carrying out the login or logout process, other than those depicted in FIG. 3 are not directly relevant to the present invention, only the various units depicted in FIG. 3 will be described herein.

The highly blurred region detection unit 11, the moderately blurred region detection unit 12, the blurring cause identifying unit 13, the warning processing unit 14, and the correction unit 15 each perform the same processing on both the input biometric image and the registered biometric image. Therefore, in the case of these units, the input biometric image and the registered biometric image will generally be referred to simply as the biometric image.

The highly blurred region detection unit 11 detects a highly blurred region having a high degree of blurring, such as the main region 211 depicted in FIG. 2, from the fingerprint image generated by the biometric information acquiring unit 4.

The highly blurred region detection unit 11 can detect a highly blurred region, based on pixel value, contrast, local ridge direction information, or frequency information.

For example, when detecting a highly blurred region based on the pixel value, the highly blurred region detection unit 11 divides the fingerprint image into a plurality of sub-regions. The entire fingerprint image can be divided, for example, into blocks of 8 pixels vertically and 8 pixels horizontally or 16 pixels vertically and 16 pixels horizontally. Next, the highly blurred region detection unit 11 computes the average pixel value and standard deviation for each sub-region. Then, for each sub-region, the highly blurred region detection unit 11 determines in accordance with the following equation a threshold value $Th_{pH}$ for identifying whether the degree of blurring is high or not.

$$Th_{pH} = P_{av} + \alpha \sigma \tag{1}$$

where $P_{av}$ is the average pixel value of the sub-region, $\sigma$ is the standard deviation of the pixel values in the sub-region, and $\alpha$ is a coefficient. If the pixel value decreases because of the adhesion of a liquid to the finger surface or excessive pressing of the finger on the biometric information acquiring unit 4, the coefficient $\alpha$ is set, for example, to −3. Conversely, if the pixel value increases because of the adhesion of a liquid to the finger surface or excessive pressing of the finger on the biometric information acquiring unit 4, the coefficient $\alpha$ is set, for example, to 3. Whether the pixel value increases or decreases because of the adhesion of a liquid, etc. depends on the characteristics of the fingerprint sensor used for the biometric information acquiring unit 4.

For each sub-region, the highly blurred region detection unit 11 compares the pixel value of each pixel in the sub-region with the threshold value $Th_{pH}$. If the pixel value deviates from the average pixel value $P_{av}$ by more than the threshold value $Th_{pH}$, the highly blurred region detection unit 11 takes the pixel as a highly blurred candidate pixel. Then, the highly blurred region detection unit 11 performs labeling on the highly blurred candidate pixels obtained across the entire fingerprint image, and detects a highly blurred candidate region formed by connecting the highly blurred candidate pixels. If the size of the highly blurred candidate region is not smaller than a predetermined size, the highly blurred region detection unit 11 determines the highly blurred candidate region as being a highly blurred region. The predetermined size is set, for example, approximately equal to a size enough to contain a plurality of ridges. The highly blurred region detection unit 11 may eliminate noise by performing a morphological closing or opening operation on the highly blurred candidate region or the highly blurred region. Further, instead of obtaining the threshold value $Th_{pH}$ for each sub-region, the highly blurred region detection unit 11 may obtain the threshold value $Th_{pH}$ from the entire fingerprint image.

When detecting a highly blurred region based on the contrast, the highly blurred region detection unit 11 also divides the fingerprint image into a plurality of sub-regions. However, in this case, the highly blurred region detection unit 11 sets the size of each sub-region large enough to contain at least one ridge/valley pair but not larger than the size of the highly blurred region to be detected. Then, the highly blurred region detection unit 11 obtains a histogram of pixel values for each sub-region. Next, the highly blurred region detection unit 11 obtains the median value of the histogram. Then, the highly blurred region detection unit 11 detects a peak above the median value and a peak below the median value. If the distance $\Delta d$ between the upper and lower peaks is smaller than a predetermined threshold value $Th_{dH}$, the highly blurred region detection unit 11 takes the sub-region as a highly blurred candidate region. The predetermined threshold value $Th_{dH}$ can be set, for example, to one quarter of the absolute value of the difference that would exist between the average pixel value of the pixels corresponding to the ridge and the average pixel value of the pixels corresponding to the valley if the fingerprint image were not blurred.

The highly blurred region detection unit 11 performs labeling on the highly blurred candidate region, and detects a region formed by connecting one or more highly blurred candidate regions as being a highly blurred region.

When detecting a highly blurred region based on the local ridge direction information, the highly blurred region detection unit 11 also divides the fingerprint image into a plurality of sub-regions. In this case also, the highly blurred region detection unit 11 sets the size of each sub-region large enough to contain at least one ridge/valley pair but not larger than the size of the highly blurred region to be detected.

In this case, the highly blurred region detection unit 11 applies a frequency transform, such as a fast Fourier transform or wavelet transform, to each sub-region. Then, the highly blurred region detection unit 11 computes the ridge direction $\theta$ of the sub-region in accordance with the following equation.

$$\theta = \arccos\left(\frac{f_h}{\sqrt{f_v^2 + f_h^2}}\right) \tag{2}$$

where fh and fv are respectively the average intensity of the horizontal components and the average intensity of the vertical components of the frequencies not lower than the frequency corresponding to the ridge-to-ridge spacing.

Further, the highly blurred region detection unit 11 performs a smoothing operation on each sub-region to reduce the frequency components higher than the frequency corresponding to the ridge-to-ridge spacing by using a smoothing filter such as a Gaussian filter, and thereafter applies a frequency transform to the thus smoothed sub-region. Then, by substituting into equation (2) the intensity of the horizontal component and the intensity of the vertical component of the frequency corresponding to the ridge-to-ridge spacing computed from the smoothed sub-region, the highly blurred region detection unit 11 computes the ridge direction $\theta s$ of the smoothed sub-region.

If the absolute value of the difference between the ridge directions $\theta$ and $\theta s$ is larger than a predetermined threshold value $Th_{aH}$, the highly blurred region detection unit 11 takes the sub-region as a highly blurred candidate region. The reason is that if the ridge/valley contrast in the sub-region is clear, it is presumed that $\theta$ and $\theta s$ are similar, regardless of whether the smoothing filter operation has been applied or not. The predetermined threshold value $Th_{aH}$ can be set, for example, to four times the average value of the absolute difference that would exist between $\theta$ and $\theta s$ if the fingerprint image were not blurred.

The highly blurred region detection unit 11 performs labeling on the highly blurred candidate region, and detects a region formed by connecting one or more highly blurred candidate regions as being a highly blurred region.

Further, when detecting a highly blurred region based on the frequency information, the highly blurred region detection unit 11 also divides the fingerprint image into a plurality of sub-regions. In this case also, the highly blurred region detection unit 11 sets the size of each sub-region large enough to contain at least one ridge/valley pair but not larger than the size of the highly blurred region to be detected.

In this case, as in the case where the local ridge direction information is used, the highly blurred region detection unit 11 applies a frequency transform, such as a fast Fourier transform or wavelet transform, to each sub-region. Then, the highly blurred region detection unit 11 computes the frequency intensity, for example, by taking the sum of the squares of the intensity of the horizontal component and the intensity of the vertical component of the frequency corresponding to the ridge-to-ridge spacing, or by computing the maximum power spectrum excluding the bias component. If the frequency intensity is smaller than a predetermined threshold value $Th_{fH}$, the highly blurred region detection unit 11 takes the sub-region as a highly blurred candidate region. The predetermined threshold value $Th_{fH}$ can be set, for example, to one quarter of the statistical value of the frequency intensity that was obtained over the entire area of the fingerprint image when the fingerprint image was not blurred.

The highly blurred region detection unit 11 performs labeling on the highly blurred candidate region, and detects a region formed by connecting one or more highly blurred candidate regions as being a highly blurred region.

The highly blurred region detection unit 11 generates information indicating the detected highly blurred candidate region, for example, a binary image in which the value is different between the pixels contained in the highly blurred candidate region and the pixels contained in other regions, and passes it to the processing unit 6.

The moderately blurred region detection unit 12 detects, from the fingerprint image generated by the biometric information acquiring unit 4, a moderately blurred region, such as the sub-region 212, 213 or region 220 depicted in FIG. 2, that is blurred but not so blurred as the highly blurred region.

Like the highly blurred region detection unit 11, the moderately blurred region detection unit 12 can detect a moderately blurred region, based on pixel value, contrast, local ridge direction information, or frequency information. Further, when detecting a moderately blurred region based on any of the above information, the moderately blurred region detection unit 12 performs the same processing as the processing that the highly blurred region detection unit 11 performs when detecting a highly blurred region based on the same kind of information. However, the moderately blurred region detection unit 12 sets the blurred region detection criteria less stringent than the criteria set by the highly blurred region detection unit 11.

For example, when detecting a moderately blurred region based on the pixel value, the moderately blurred region detection unit 12 determines a threshold value $Th_{pL}$ for identifying whether the degree of blurring is high or not, in accordance with the same equation (1) as that used to determine the threshold value $Th_{pH}$. However, the absolute value of the coefficient α is set, for example, to 2 which is lower than the value used when determining the threshold value $Th_{pH}$.

Further, when detecting a moderately blurred region based on the contrast, the moderately blurred region detection unit 12 sets a threshold value $Th_{dL}$ for the distance between the peaks of the histogram to a value larger than the threshold value $Th_{dH}$. For example, the threshold value $Th_{dL}$ is set to one half of the absolute value of the difference that would exist between the average pixel value of the pixels corresponding to the ridge and the average pixel value of the pixels corresponding to the valley if the fingerprint image were not blurred.

Likewise, when detecting a moderately blurred region based on the local ridge direction information, the moderately blurred region detection unit 12 sets a threshold value $Th_{aL}$ for the angle difference between the ridge directions to a value smaller than the threshold value $Th_{aH}$. For example, the threshold value $Th_{aL}$ is set to twice the average value of the absolute difference that would exist between θ and θs if the fingerprint image were not blurred.

Further, when detecting a moderately blurred region based on the frequency information, the moderately blurred region detection unit 12 sets a threshold value $Th_{fL}$ for the frequency intensity to a value larger than the threshold value $Th_{fH}$. For example, the threshold value $Th_{fL}$ is set to one half of the statistical value of the frequency intensity that was obtained over the entire area of the fingerprint image when the fingerprint image was not blurred.

The moderately blurred region detection unit 12 generates information indicating the detected moderately blurred candidate region, for example, a binary image in which the value is different between the pixels contained in the moderately blurred candidate region and the pixels contained in other regions, and passes it to the processing unit 6.

The blurring cause identifying unit 13 identifies whether the cause of the blurred region detected on the fingerprint image is the adhesion of a liquid to the finger surface or the excessive pressing of the finger on the biometric information acquiring unit 4.

Referring back to FIG. 2, in the case of the blurred region 210 caused by the adhesion of a liquid to the finger surface, since a relatively large amount of liquid is adhering, a moderately blurred region whose degree of blurring is relatively low is formed adjacent to the highly blurred region because of the spreading of the liquid. On the other hand, in the case of the blurred region 220 caused by the user's finger being pressed too tightly on the biometric information acquiring unit 4, the degree of blurring is uniform across the region, compared with that of the region 210.

In view of the above, the blurring cause identifying unit 13 examines whether a moderately blurred region has been detected within a search area defined adjacent to the highly blurred region detected by the highly blurred region detection unit 11, and thereby identifies whether or not the cause of the blurred region detected on the fingerprint image is the adhesion of a liquid to the finger surface.

In this case, the blurring cause identifying unit 13 may fix the search area for the moderately blurred region to a predetermined size, or may vary its size according to the size or position of the highly blurred region. When setting the search area to a fixed size, the search area can be set equal in size to a region over which the liquid can spread along the finger surface, for example, to a region of a size one-eighth horizontally and one-eighth vertically of the entire fingerprint image size centered around the center of gravity of the highly blurred region.

When varying the search area size according to the position of the highly blurred region, the blurring cause identifying unit 13 may determine in accordance with the following equation the distance measured from the center of gravity of the highly blurred region to the edge of the search area along the direction in which the user slides his finger on the biometric information acquiring unit 4.

$$SW = L \times \cos \phi + W_{offset} \quad (3)$$

where φ is the absolute difference between the finger slide direction and the ridge direction near the highly blurred region. The ridge direction is computed by substituting into equation (2) the horizontal and vertical frequency components obtained by applying a frequency transform to a region near the highly blurred region. On the other hand, L is a predetermined length, which is set, for example, to one-eighth of the length of the fingerprint image measured along the direction in which the user slides his finger on the biometric information acquiring unit 4. Further, $W_{offset}$ is an offset value, which is set, for example, equal to the length of the highly blurred region measured along the finger slide direction. As can be seen from equation (3), the search area size increases as the absolute difference between the finger slide direction and the ridge direction near the highly blurred region decreases. This is because, if the ridge direction is parallel to the direction in which the user slides his finger on the biometric information acquiring unit 4, the liquid adhering to the finger surface easily spreads along the valleys. On the other hand, as the angle between the ridge direction and the direction in which the user slides his finger on the biometric information acquiring unit 4 becomes closer to the right angle, the liquid becomes more difficult to spread because the ridge serves as a barrier to the liquid.

Further, the width of the search area, measured along a direction perpendicular to the direction in which the user slides his finger on the biometric information acquiring unit 4, is set, for example, equal to the width of the highly blurred region measured in a direction parallel to that perpendicular direction.

On the other hand, when varying the search area size according to the size of the highly blurred region, the blurring cause identifying unit 13 increases the search area size as the size of the highly blurred region increases. For example, the blurring cause identifying unit 13 may determine the distance from the center of gravity of the highly blurred region to the edge of the search area, measured along the direction in which the user slides his finger on the biometric information acquiring unit 4, by multiplying the length of the highly blurred region measured along that direction by a given coefficient. The given coefficient here is set to a value not smaller than 1, for example, to 2. The reason is that, as the size of the highly blurred region increases, the liquid tends to spread over a larger area because the amount of liquid adhering to the finger surface is larger.

Further, the width of the search area, measured along a direction perpendicular to the direction in which the user slides his finger on the biometric information acquiring unit 4, is set, for example, equal to the width of the highly blurred region measured in a direction parallel to that perpendicular direction.

The blurring cause identifying unit 13 first determines whether a highly blurred region has been detected on the fingerprint image. If no highly blurred region has been detected, the blurring cause identifying unit 13 determines that no blurred region due to the adhesion of a liquid to the finger surface has been detected.

On the other hand, if a highly blurred region has been detected, the blurring cause identifying unit 13 then determines whether a moderately blurred region has been detected within the search area defined adjacent to the highly blurred region. If a moderately blurred region has been detected within the search area, the blurring cause identifying unit 13 determines that the highly blurred region and the moderately blurred region are due to the adhesion of a liquid to the finger surface.

If no moderately blurred region has been detected within the search area, the blurring cause identifying unit 13 determines that the highly blurred region is due to excessive pressing of the finger on the biometric information acquiring unit 4. If a moderately blurred region has been detected in addition to the highly blurred region but outside the search area adjacent to the highly blurred region, the blurring cause identifying unit 13 determines that the moderately blurred region also is due to excessive pressing of the finger on the biometric information acquiring unit 4.

The blurring cause identifying unit 13 generates cause information indicating the cause of each detected blurred region. The cause information has, for example, one numerical value. If the blurred region is due to the adhesion of a liquid to the finger surface, the cause information has a value of 1, and if the blurred region is due to the excessive pressing of the finger on the biometric information acquiring unit 4, the cause information has a value of 2. If more than one blurred region has been detected on the same fingerprint image, and the cause of each blurred region is different, the cause information has a value of 3.

The blurring cause identifying unit 13 sends the cause information corresponding to the respective causes to the warning processing unit 14.

The warning processing unit 14 selects a warning message to be presented to the user in accordance with the cause information received from the blurring cause identifying unit 13. For example, when the cause information indicates that only the blurred region due to the adhesion of a liquid to the finger surface has been detected as the blurred region, the warning processing unit 14 retrieves from the storage unit 5 a warning message indicating the adhesion of a liquid to the finger surface. The warning message here may be a message prompting the user to eliminate the cause of the blurred region, such as "Your finger may be wet. Please wipe your finger and try again."

When the cause information indicates that only the blurred region due to the excessive pressing of the finger on the biometric information acquiring unit 4 has been detected as the blurred region, the warning processing unit 14 retrieves from the storage unit 5 a warning message indicating the excessive pressing of the finger. The warning message here may be a message prompting the user to eliminate the cause of the blurred region, such as "You are pressing your finger too tight. Please try again by touching your finger lightly onto the sensor."

On the other hand, when the cause information indicates that both the blurred region due to the adhesion of a liquid to the finger surface and the blurred region due to the excessive pressing of the finger on the biometric information acquiring unit 4 have been detected, the warning processing unit 14 retrieves the warning messages corresponding to the respective causes from the storage unit 5.

The warning processing unit 14 displays the retrieved warning message on the display unit 3, prompting the user to eliminate the cause of the blurred region and retry the scanning of the fingerprint. If the computer 1 is equipped with a speaker, the warning message may be presented by voice to the user through the speaker.

Figure 4B:
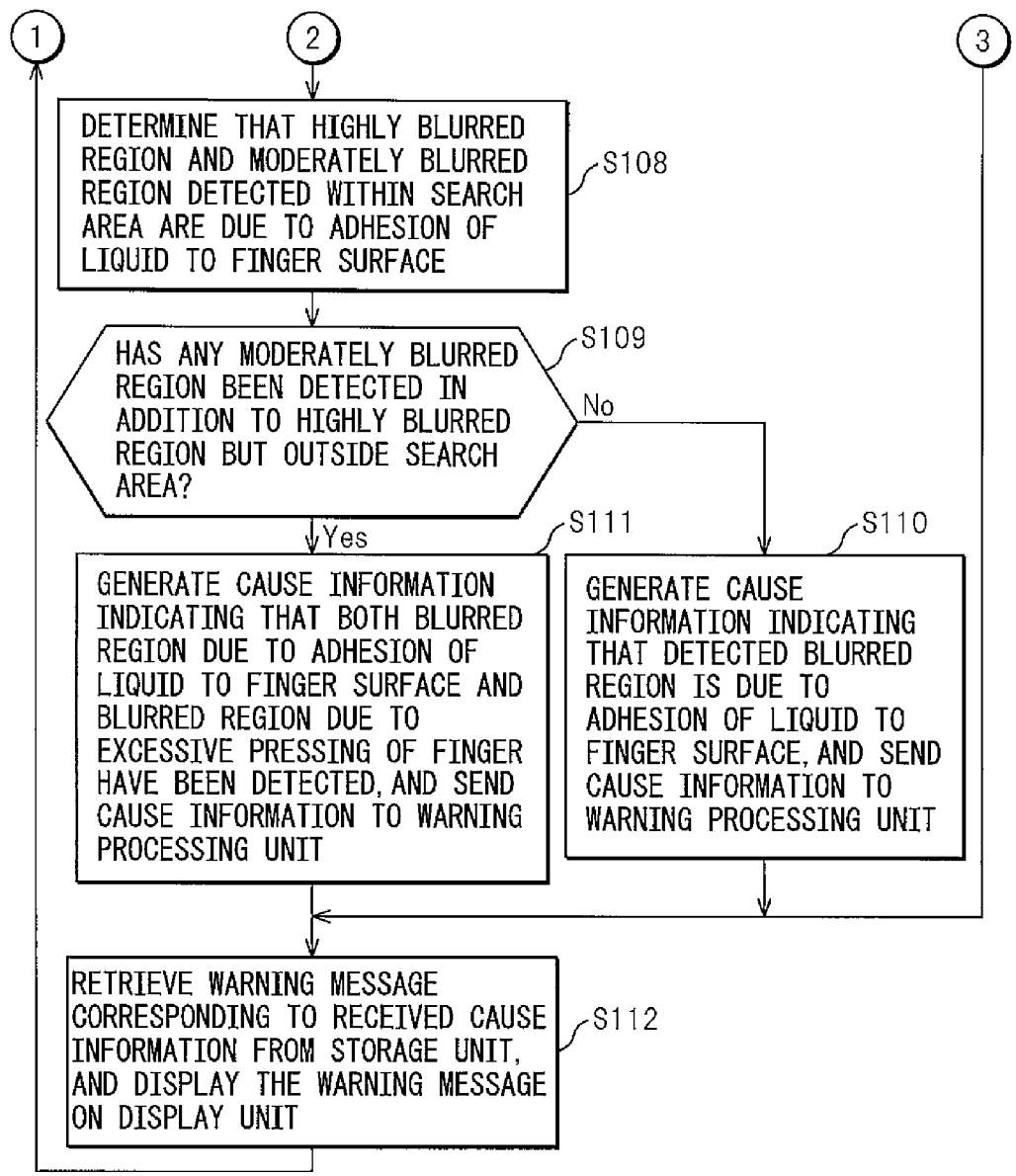
FIG. 4B is an operation flowchart of a fingerprint image input process which is controlled by a computer program executed on the processing unit according to the one embodiment.

FIGS. 4A and 4B are an operation flowchart of a fingerprint image input process which is controlled by a computer program executed on the processing unit 6.

As illustrated in FIGS. 4A and 4B, when a user registration request or a login request is made via the input unit 2, the processing unit 6 starts the input process. Then, the processing unit 6 acquires the user's fingerprint image generated by the biometric information acquiring unit 4 (step S101).

Next, the highly blurred region detection unit 11 in the processing unit 6 detects a highly blurred region having a high degree of blurring from the fingerprint image (step S102). Then, the highly blurred region detection unit 11 passes information indicating the detected highly blurred region to the processing unit 6. From other regions in the fingerprint image than the highly blurred region, the moderately blurred region detection unit 12 in the processing unit 6 detects a moderately blurred region whose degree of blurring is lower than the highly blurred region (step S103). Then, the moderately blurred region detection unit 12 passes information indicating the detected moderately blurred region to the processing unit 6.

The processing unit 6 passes the information indicating the highly blurred region and the information indicating the moderately blurred region to the blurring cause identifying unit 13 in the processing unit 6. The blurring cause identifying unit 13 determines whether any highly blurred region has been detected on the fingerprint image (step S104). If no highly blurred region has been detected (No in step S104), the blurring cause identifying unit 13 then determines whether any moderately blurred region has been detected on the fingerprint image (step S105). If a moderately blurred region has been detected (Yes in step S105), the blurring cause identifying unit 13 determines that the moderately blurred region is due to the excessive pressing of the finger on the biometric information acquiring unit 4 (step S106). Then, the blurring cause identifying unit 13 generates cause information indicating that the moderately blurred region is due to the excessive pressing of the finger on the biometric information acquiring unit 4, and sends the cause information to the warning processing unit 14. On the other hand, if no moderately blurred region has been detected (No in step S105), the blurring cause identifying unit 13 notifies the processing unit 6 accordingly, whereupon the processing unit 6 terminates the input process. After that, the processing unit 6 performs the registration process or the matching process by using the thus entered fingerprint image.

On the other hand, if a highly blurred region has been detected in step S104 (Yes in step S104), the blurring cause identifying unit 13 determines whether any moderately blurred region has been detected within the search area defined adjacent to the highly blurred region (step S107). If a moderately blurred region has been detected within the search area (Yes in step S107), the blurring cause identifying unit 13 determines that the highly blurred region and the moderately blurred region detected within the search area adjacent to the highly blurred region are due to the adhesion of a liquid to the finger surface (step S108). Further, the blurring cause identifying unit 13 determines whether any moderately blurred region has been detected in addition to the highly blurred region but outside the search area (step S109). If no such moderately blurred region has been detected (No in step S109), the blurring cause identifying unit 13 generates cause information indicating that the detected blurred region is due to the adhesion of a liquid to the finger surface, and sends the cause information to the warning processing unit 14 (step S110).

On the other hand, if such a moderately blurred region has been detected (Yes in step S109), the blurring cause identifying unit 13 generates cause information indicating that both the blurred region due to the adhesion of a liquid to the finger surface and the blurred region due to the excessive pressing of the finger on the biometric information acquiring unit 4 have been detected. Then, the blurring cause identifying unit 13 sends the cause information to the warning processing unit 14 (step S111).

On the other hand, if no moderately blurred region has been detected within the search area (No in step S107), the blurring cause identifying unit 13 determines that the highly blurred region is due to the excessive pressing of the finger on the biometric information acquiring unit 4 (step S106). Then, the blurring cause identifying unit 13 generates cause information indicating that the highly blurred region is due to the excessive pressing of the finger on the biometric information acquiring unit 4, and sends the cause information to the warning processing unit 14.

After step S106, S110, or S111, the warning processing unit 14 retrieves the warning message corresponding to the received cause information from the storage unit 5. Then, the warning processing unit 14 displays the warning message on the display unit 3 (step S112). After that, the processing unit 6 enters a standby state, and when the user has his fingerprint rescanned by the biometric information acquiring unit 4, control is returned to step S101. To prevent the process from entering an endless loop, if the process from step S101 to step S112 has been repeated a predetermined number of times, the processing unit 6 may proceed to perform the matching/registration process by using the fingerprint image in which the total area of the highly blurred and moderately blurred regions is the smallest among the fingerprint images so far acquired. In this case, each time the fingerprint image is acquired from the biometric information acquiring unit 4, the processing unit 6 temporarily stores the fingerprint image in the storage unit 5. Further, the processing unit 6 may interchange the order of steps S102 and S103. In this case, the processing unit 6 performs processing to detect the highly blurred region within the detected moderately blurred region.

When a highly blurred region or a moderately blurred region has been detected on the acquired fingerprint image, the correction unit 15 receives the fingerprint image from the processing unit 6, together with the information indicating the highly blurred region or moderately blurred region detected on the fingerprint image. Then, the correction unit 15 applies such a correction as to increase the ridge/valley contrast to the highly blurred region or moderately blurred region. For example, the correction unit 15 may convert the pixel values of the pixels contained in the highly blurred region or moderately blurred region into grayscale values in accordance with a grayscale curve that enlarges the difference between the smallest and largest pixels values of the pixels contained in the highly blurred region or moderately blurred region. In this case, the correction unit 15 may make the slope of the grayscale curve to be applied to the highly blurred region greater than the slope of the grayscale curve to be applied to the moderately blurred region. By so doing, the correction unit 15 can apply the proper correction according to the degree of blurring. The correction unit 15 can thus suppress the generation of artifacts due to application of an excessive correction to the moderately blurred region, while also suppressing a reduction in contrast between the ridges and valleys due to application of an insufficient correction to the highly blurred region.

Alternatively, the correction unit 15 may perform the correction by applying a frequency transform to each of the moderately blurred and highly blurred regions. In this case, the correction unit 15 frequency-transforms the moderately blurred region and the highly blurred region, separately. Then, using a filter whose coefficient for the frequency component corresponding to the ridge period is larger than the coefficients for other frequency components, the correction unit 15 filters the spatial frequency image generated by frequency-transforming each of the moderately blurred and highly blurred region. After that, the correction unit applies an inverse frequency transform to the filtered spatial frequency image. In this case also, the correction unit 15 may make the coefficient of the filter for the frequency component corresponding to the ridge period, to be applied to the highly blurred region, greater than the coefficient of the filter for that frequency component to be applied to the highly blurred region.

Alternatively, the correction unit 15 may apply such a correction as to increase the ridge/valley contrast to the moderately blurred region in order to suppress the generation of artifacts due to the correction, but may not apply such a correction to the highly blurred region.

The correction unit 15 passes the corrected fingerprint image to the processing unit 6.

When registering the fingerprint image, the processing unit 6 passes the corrected fingerprint image to the feature amount extraction unit 16 as the registered fingerprint image. Further, the processing unit 6 passes the information indicating the highly blurred region and moderately blurred region detected on the registered fingerprint image to the registration processing unit 17 by associating the information with the registered fingerprint image. On the other hand, when performing the matching process, the processing unit 6 passes the corrected fingerprint image to the matching unit 18 as the input fingerprint image. The processing unit 6 may pass the information indicating the highly blurred region and moderately blurred region detected on the input fingerprint image to the matching unit 18 together with the input fingerprint image.

When registering data concerning the registered biometric information, the feature amount extraction unit 16 extracts the matching feature amount from the registered fingerprint image. When performing the matching process, the feature amount extraction unit 16 extracts the matching feature amount from the input fingerprint image.

The feature amount extraction unit 16 extracts minutiae (feature points), such as the branch points and end points of the ridges, as the feature amount. To extract the branch points and end points of the ridges from the input fingerprint image, the feature amount extraction unit 16 binarizes the input fingerprint image by using, for example, a method of local thresholding. Next, the feature amount extraction unit 16 performs thinning on the binarized input fingerprint image. After that, the feature amount extraction unit 16 scans a sub-region of the thinned input fingerprint image by using a plurality of mask patterns, and detects the position on the input fingerprint image when it matches one of the mask patterns. Then, the feature amount extraction unit 16 extracts the pixel at the center of the detected position as a feature point. Each mask pattern is described, for example, by 3×3 pixels, and has a binary pattern corresponding to a ridge branch point or end point. Further, the feature amount extraction unit 16 obtains the position of the extracted feature point and the ridge direction near the feature point as the information representing the feature point. The feature amount extraction unit 16 can use any known method in order to obtain the ridge direction near the feature point. In the case of the registered fingerprint image also, the feature amount extraction unit 16 extracts the feature points from the registered fingerprint image by performing the same processing as that performed on the input fingerprint image. Then, the feature amount extraction unit 16 obtains the position of each extracted feature point and the ridge direction near the feature point. The feature amount extraction unit 16 may extract the feature points from the input fingerprint image and the registered fingerprint image by using other known methods for obtaining ridge end points or branch points as feature points.

When registering the data concerning the registered biometric information, the feature amount extraction unit 16 passes the feature amount, such as a plurality of feature points extracted from the registered fingerprint image, as the data to the registration processing unit 17. When performing the matching process, the feature amount extraction unit 16 passes the feature amount, such as a plurality of feature points extracted from the input fingerprint image, to the matching unit 18.

When the matching unit 18 does not use a matching method that utilizes the feature amount, for example, when the matching unit 18 performs the matching by using pattern matching, as will be described later, the feature amount extraction unit 18 may be omitted.

The registration processing unit 17 stores the data concerning the registered biometric information in the storage unit 5. In this case, the registration processing unit 17 associates the feature amount, such as the plurality of feature points extracted by the feature amount extraction unit 16 from the fingerprint image acquired by the biometric information acquiring unit 4 as the fingerprint image for registration, with the user's identification information entered from the input unit 2. Then, the registration processing unit 17 stores the feature amount in the storage unit 5 together with the user's identification information. However, when a warning message is presented to the user by the warning processing unit 14, the biometric information acquiring unit 4 reacquires the fingerprint image in response to the warning message, and the registration processing unit 17 takes the reacquired fingerprint image as the fingerprint image for registration. Then, the registration processing unit 17 stores the feature amount, such as the plurality of feature points extracted from the reacquired fingerprint image, in the storage unit 5 as the data concerning the registered biometric information.

When the feature amount of the registered fingerprint image is stored in advance in the storage unit 5, as described above, the matching unit 18 can retrieve the feature point information of the registered fingerprint image from the storage unit 5 when performing the matching process; this serves to reduce the time needed to perform the matching.

The registration processing unit 17 may store the registered fingerprint image itself, or a sub-region of the registered fingerprint image, in the storage unit 5 together with the feature amount extracted from the registered fingerprint image. Further, when the matching unit 18 does not use a matching method that utilizes the feature amount, for example, when the matching unit 18 performs the matching by using pattern matching, as will be described later, the registration processing unit 17 stores the registered fingerprint image itself, or a sub-region of the registered fingerprint image, in the storage unit 5 as the data concerning the registered biometric information together with the user's identification information. In this case also, when a warning message is presented to the user by the warning processing unit 14, the biometric information acquiring unit 4 reacquires the fingerprint image in response to the warning message, and the registration processing unit 17 takes the reacquired fingerprint image as the fingerprint image for registration.

Further, the registration processing unit 17 may store the information indicating the highly blurred region and the moderately blurred region detected from the registered fingerprint image corresponding to the registered biometric information, in the storage unit 5 by associating the information with the data concerning the registered biometric information.

Figure 5:
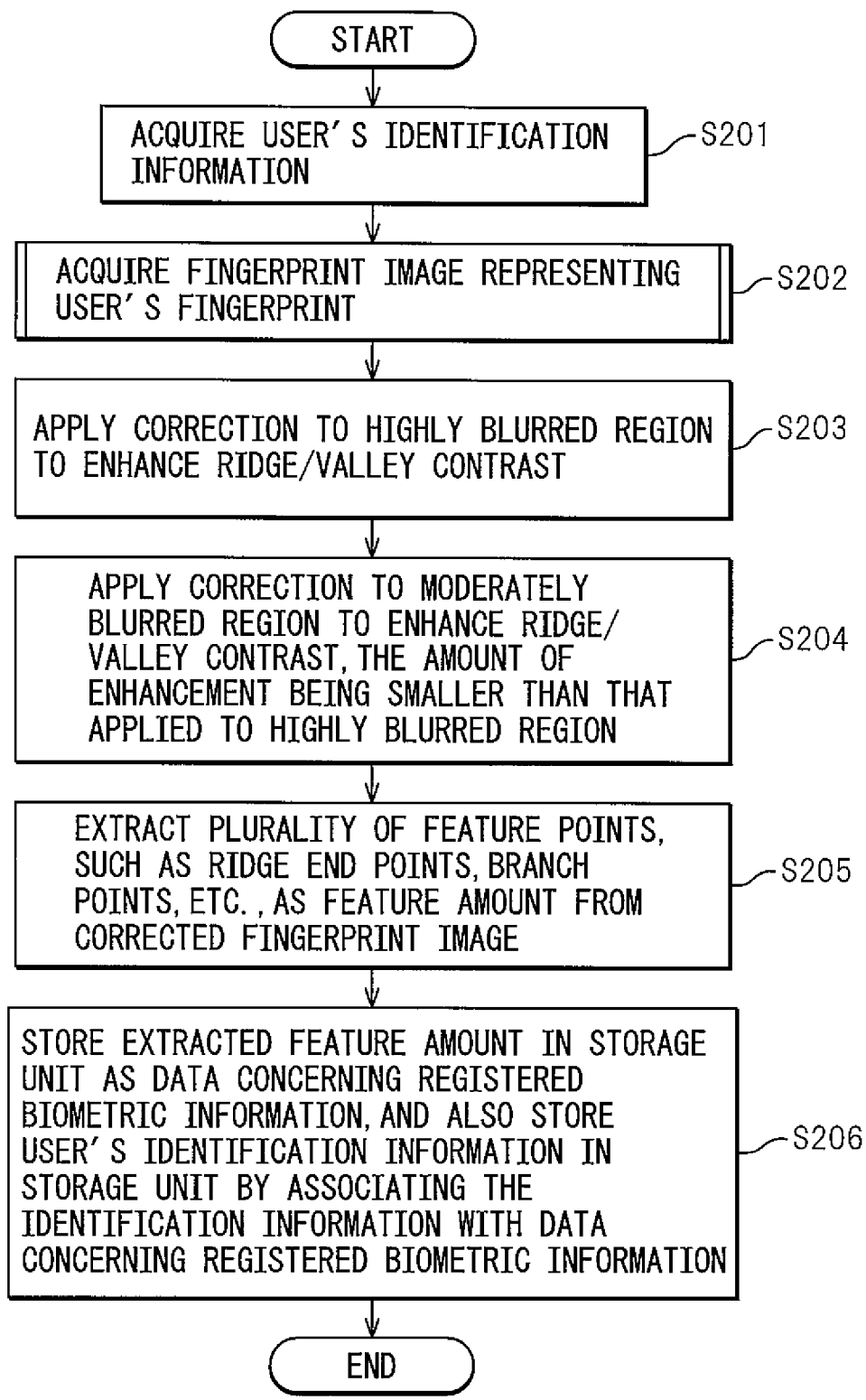
FIG. 5 is an operation flowchart of a fingerprint image registration process which is controlled by a computer program executed on the processing unit.

FIG. 5 is an operation flowchart of a fingerprint image registration process which is controlled by a computer program executed on the processing unit 6.

As illustrated in FIG. 5, when a user registration request is made via the input unit 2, the processing unit 6 starts the registration process. Then, the processing unit 6 acquires the user's identification information entered via the input unit 2 for registration (step S201). Further, in accordance with the fingerprint input process of FIGS. 4A and 4B, the processing unit 6 acquires the user's fingerprint image generated by the biometric information acquiring unit 4 (step S202).

After that, the processing unit 6 passes the fingerprint image and the information indicating the highly blurred region and the moderately blurred region to the correction unit 15. Then, the correction unit 15 applies a correction to the highly blurred region to enhance the contrast between the ridges and valleys contained in that region (step S203). Further, the correction unit 15 applies a correction to the moderately blurred region to enhance the contrast between the ridges and valleys contained in that region (step S204). However, the amount of enhancement applied to the moderately blurred region is smaller than the amount of enhancement applied to the highly blurred region. The correction unit 15 passes the thus corrected fingerprint image to the processing unit 6.

After that, the feature amount extraction unit 16 in the processing unit 6 extracts a plurality of feature points, such as the ridge end points, branch points, etc., as the feature amount from the corrected fingerprint image (step S205). Then, the registration processing unit 17 in the processing unit 6 stores the feature amount extracted from the fingerprint image in the storage unit 5 as the data concerning the registered biometric information (step S206). In this case, the registration processing unit 17 also stores the user's identification information, entered via the input unit 2 for registration, in the storage unit 5 by associating the identification information with the data concerning the registered biometric information. Then, the processing unit 6 terminates the fingerprint image registration process.

In step S206, the registration processing unit 17 may store, together with the feature amount, the fingerprint image from which the feature amount has been extracted, or a sub-region thereof, in the storage unit 5 as the registered fingerprint image or its sub-region, as earlier described. Further, when the matching unit 18 does not use a matching method that utilizes the feature amount, for example, when the matching unit 18 performs the matching by using pattern matching, step S205 may be omitted. In this case, in step S206, the registration processing unit 17 stores the fingerprint image corrected in step S204, or a sub-region thereof, in the storage unit 5 as the registered fingerprint image representing the registered biometric information or its sub-region, together with the user's identification information.

The matching unit 18 compares the input fingerprint represented in the input fingerprint image with the registered fingerprint represented in the registered fingerprint image. The matching unit 18 obtains as the result of the comparison the degree of similarity indicating the degree to which the input fingerprint is similar to the registered fingerprint image.

The matching unit 18 may use such techniques as minutia matching or pattern matching to perform the matching between the input fingerprint image and the registered fingerprint image.

When performing the matching between the input fingerprint and the registered fingerprint by minutia matching, the matching unit 18 uses the feature points extracted from the input fingerprint image by the feature amount extraction unit 16 and the plurality of feature points extracted from the registered fingerprint image and stored in the storage unit 5 as the data concerning the registered biometric information. For example, the matching unit 18 selects the feature point located at or near the center of the registered fingerprint image as a first reference feature point. Further, the matching unit 18 selects one of the feature points extracted from the input fingerprint image as a second reference feature point. Then, the matching unit 18 translates the input fingerprint image so as to bring the second reference feature point into registry with the first reference feature point. After that, while rotating the input fingerprint image, the matching unit 18 obtains the number of feature points of the input fingerprint image that match the feature points of the registered fingerprint image. By repeating the above process while changing the combination of the first reference feature point and the second reference feature point, the matching unit 18 obtains the maximum number of feature points of the input fingerprint image that match the feature points of the registered fingerprint image.

Finally, the matching unit 18 obtains the degree of similarity by dividing the maximum number by the total number of feature points extracted from the input fingerprint image. In this case, the degree of similarity takes any value between 0 and 1, and the higher the degree of similarity between the input fingerprint image and the registered fingerprint image, the closer to 1 the value of the degree of similarity.

To detect the feature points of the input fingerprint image that match the feature points of the registered fingerprint image, the matching unit 18 examines whether a feature point of the registered fingerprint image exists within a predetermined range centered at the position of an attention feature point of the input fingerprint image. The predetermined range here may be chosen to have a value equivalent, for example, to the average spacing between two adjacent ridges. If a feature point of the registered fingerprint image exists within the predetermined range centered at the position of the attention feature point, the matching unit 18 obtains the angle difference between the ridge directions near the respective feature points. If the absolute angle difference between the ridge directions falls within a predetermined angle range, the matching unit 18 determines that the feature point of the registered fingerprint image matches the attention feature point of the input fingerprint image. The predetermined angle range here is chosen to have a value corresponding to an allowable range within which the ridge direction near the attention feature point can be considered to match the ridge direction near the corresponding feature point of the registered fingerprint image, and may be set, for example, to 10 degrees. The matching unit 18 may determine that the feature point of the registered fingerprint image that matches the attention feature point of the input fingerprint image exists, only when the same kind of feature point of the registered fingerprint image as the attention feature point exists within the predetermined range centered at the position of the attention feature point. Further, the matching unit 18 may use other known methods to obtain the number of feature points of the registered fingerprint image that match the number of feature points in a sub-region of the input fingerprint image.

Further, the matching unit 18 may set a confidence level for each feature point, based on whether the feature point is contained in a blurred region or not. Then, instead of obtaining the number of feature points of the input fingerprint image that match the feature points of the registered fingerprint image, the matching unit 18 may compute the sum of the confidence levels of the feature points of the input fingerprint image that are judged to match the feature points of the registered fingerprint image.

In this case, the matching unit 18 assigns the lowest confidence level to the feature points contained in the highly blurred region. The matching unit 18 sets the confidence level of the feature points contained in the moderately blurred region higher than the confidence level of the feature points contained in the highly blurred region but lower than the confidence level of the feature points contained in neither of the blurred regions. For example, the matching unit 18 sets the confidence level of the feature points contained in the highly blurred region to 0.4, the confidence level of the feature points contained in the moderately blurred region to 0.7, and the confidence level of the feature points contained in neither of the blurred regions to 1.

The matching unit 18 can thus reduce the effects that a feature point obtained from a region having a high degree of blurring will have on the result of the matching. As a result, if a false feature point is detected because the image is blurred, the matching unit 18 can prevent the matching accuracy from degrading due to the detection of such a false feature point.

Further, the matching unit 18 may be configured not to extract any feature points from the highly blurred region. In this case also, the matching unit 18 may set the confidence level of the feature points contained in the moderately blurred region lower than the confidence level of the feature points contained in neither of the blurred regions. In this way, the matching unit 18 can exclude, from the feature point extraction area, only the region from which feature points may not be able to be extracted correctly due to a very high degree of blurring. The matching unit 18 can thus suppress the degradation of the matching accuracy.

On the other hand, when performing the matching between the input fingerprint and the registered fingerprint by pattern matching, the matching unit 18 uses the input fingerprint image corrected by the correction unit 15 and the registered fingerprint image or a sub-region thereof stored in the storage unit 5 as the data concerning the registered biometric information. Then, while variously changing the position of the input fingerprint image relative to the registered fingerprint image or its sub-region, the matching unit 18 computes the correlation c(i, j) between the input fingerprint image and the registered fingerprint image or its sub-region by using the following equation.

$$c(i, j) = \frac{\sum_x \sum_y \{(I(x, y) - I_{av})(T(x - i, y - j) - T_{av})\}}{\sqrt{\sum_x \sum_y (I(x, y) - I_{av})^2 \sum_x \sum_y (T(x - i, y - j) - T_{av})^2}} \quad (4)$$

Here, I(x, y) represents the pixel value of a pixel contained in the input fingerprint image and located at a position designated by a horizontal coordinate x and a vertical coordinate y. Further, T(x−1, y−1) represents the pixel value of a pixel contained in the registered fingerprint image or its sub-region and located at a position designated by a horizontal coordinate (x−1) and a vertical coordinate (y−1). On the other hand, $I_{av}$ is the average pixel value of the pixels contained in the input fingerprint image, while $T_{av}$ is the average pixel value of the pixels contained in the registered fingerprint image or its sub-region. Here, i and j indicate the amount of displacement between the input fingerprint image and the registered fingerprint image in the horizontal direction and vertical direction, respectively. Further, c(i, j) represents the correlation value when the input fingerprint image is displaced relative to the registered fingerprint image by i pixels in the horizontal direction and j pixels in the vertical direction. The correlation value c(i, j) can take any value between −1 and 1. The correlation value c(i, j) is 1 when the input fingerprint image perfectly matches the registered fingerprint image. On the other hand, when the input fingerprint image is completely reversed with respect to the registered fingerprint image, the correlation value c(i, j) is −1.

In this case, the matching unit 18 may compute the correlation value c(i, j) by excluding the highly blurred region from the input fingerprint image or the registered fingerprint image.

The matching unit 18 passes the thus computed degree of similarity to the authentication judgment unit 19.

The authentication judgment unit 19 compares the degree of similarity computed by the matching unit 18 with a predetermined matching threshold value. If the degree of similarity is greater than the matching threshold value, the authentication judgment unit 19 determines that the input fingerprint matches the registered fingerprint. Then, the authentication judgment unit 19 authenticates the user trying to log in to the computer 1 as being the registered user corresponding to the user's identification information entered by that user. When the user is authenticated, the authentication judgment unit 19 reports the result of the authentication to the processing unit 6. Then, the processing unit 6 carries out the login process to permit the thus authenticated user to use the computer 1.

On the other hand, if the degree of similarity is not greater than the matching threshold value, the authentication judgment unit 19 determines that the input fingerprint does not match the registered fingerprint. In this case, the authentication judgment unit 19 does not authenticate the user trying to log in. Then, the authentication judgment unit 19 notifies the processing unit 6 of the result of the authentication indicating the failure to authenticate the user. Thereupon, the processing unit 6 aborts the login process. The processing unit 6 denies the unauthenticated user an access to the computer 1. For example, the processing unit 6 displays on the display unit 3 a message indicating that the login failed.

It is preferable to set the matching threshold value to such a value that the authentication judgment unit 19 succeeds to authenticate the user only when the user tying to log in is a legitimate registered user. It is also preferable to set the matching threshold value to such a value that the authentication judgment unit 19 fails to authenticate the user when the user tying to log in is a person other than a legitimate registered user. For example, the matching threshold value may be determined by multiplying the difference between the maximum and minimum values of the degree of similarity by 0.7 and adding the resulting product to the minimum value of the degree of similarity.

Figure 6B:
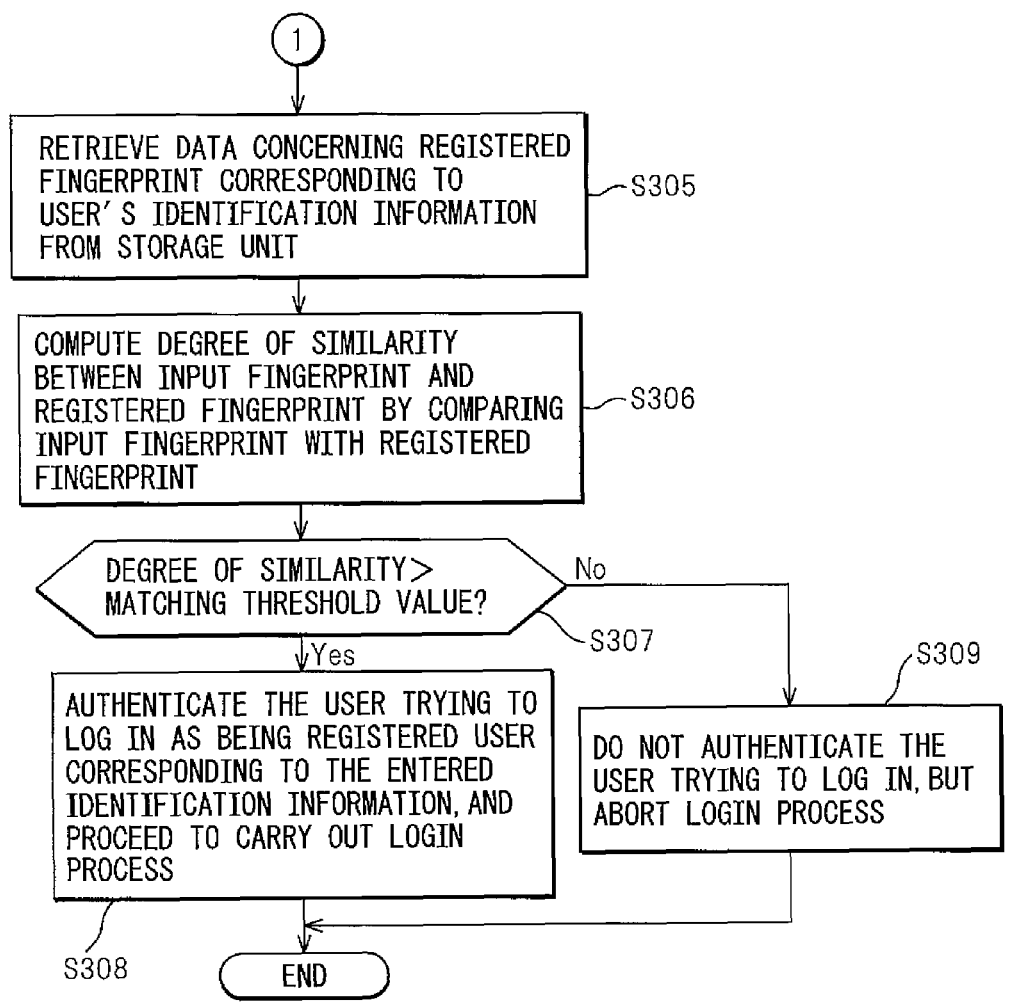
FIG. 6B is an operation flowchart of a biometric authentication process which is controlled by a computer program executed on the processing unit.

FIGS. 6A and 6B are an operation flowchart of a biometric authentication process which is controlled by a computer program executed on the processing unit 6.

As illustrated in FIGS. 6A and 6B, when the user makes a login request via the input unit 2, the processing unit 6 starts the biometric authentication process. Then, the processing unit 6 acquires the identification information that the user trying to log in has entered via the input unit 2 (step S301). After that, the processing unit 6 proceeds to carry out steps S302 to S304. The process from steps S302 to S304 is the same as the process from steps S202 to S204 in the operation flowchart of the fingerprint image registration process illustrated in FIG. 5, except that the fingerprint image to be processed here is the input fingerprint image. Accordingly, the description of steps S302 to S304 will not be given herein.

After step S304, the processing unit 6 retrieves from the storage unit 5 the data concerning the registered fingerprint corresponding to the user's identification information entered from the input unit 2 (step S305). Then, the processing unit 6 passes the input fingerprint image and the data concerning the registered fingerprint to the matching unit 18 in the processing unit 6.

The matching unit 18 computes the degree of similarity between the input fingerprint and the registered fingerprint by comparing the input fingerprint represented in the input fingerprint image with the registered fingerprint, for example, by minutia matching or pattern matching (step S306). Then, the matching unit 18 passes the computed degree of similarity to the authentication judgment unit 19 in the processing unit 6.

The authentication judgment unit 19 determines whether the degree of similarity thus computed is greater than the matching threshold value (step S307). If the degree of similarity is greater than the matching threshold value (Yes in step S307), the authentication judgment unit 19 determines that the input fingerprint matches the registered fingerprint. Then, the authentication judgment unit 19 authenticates the user trying to log in as being the registered user corresponding to the user's identification information entered by that user (step S308). The authentication judgment unit 19 reports the result of the authentication to the processing unit 6. Then, the processing unit 6 proceeds to carry out the login process.

On the other hand, if the degree of similarity is not greater than the matching threshold value (No in step S307), the authentication judgment unit 19 determines that the input fingerprint does not match the registered fingerprint. In this case, the authentication judgment unit 19 does not authenticate the user trying to log in (step S309). The authentication judgment unit 19 reports the result of the authentication to the processing unit 6. Thereupon, the processing unit 6 aborts the login process.

After step S308 or S309, the processing unit 6 terminates the biometric authentication process.

Figure 8A:
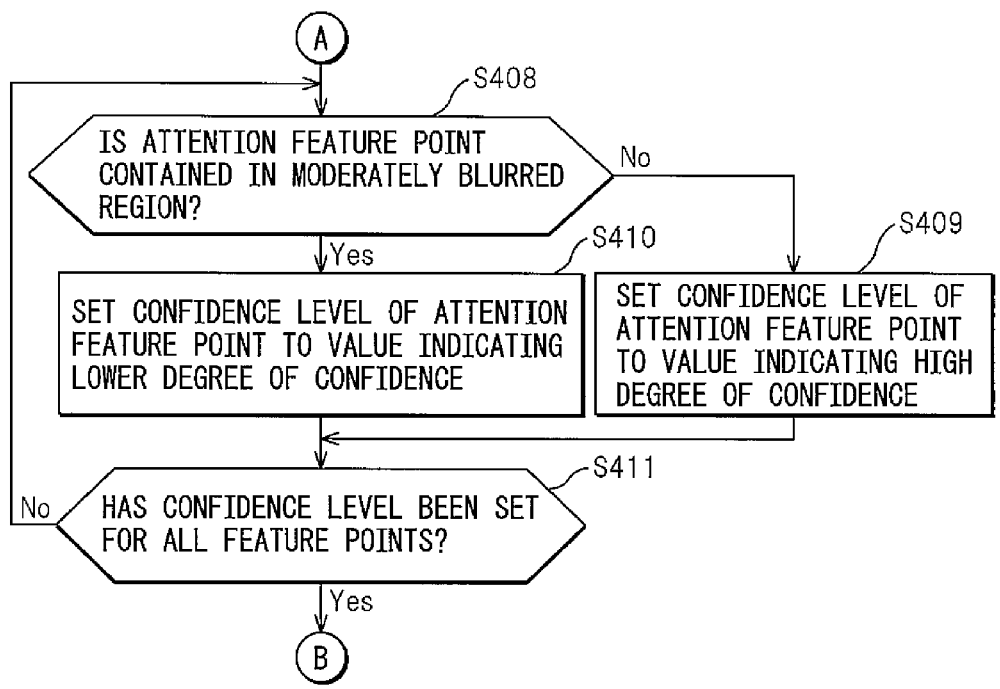
FIG. 8A is an operation flowchart of the alternative example of the biometric authentication process which is controlled by the computer program executed on the processing unit.
Figure 8B:
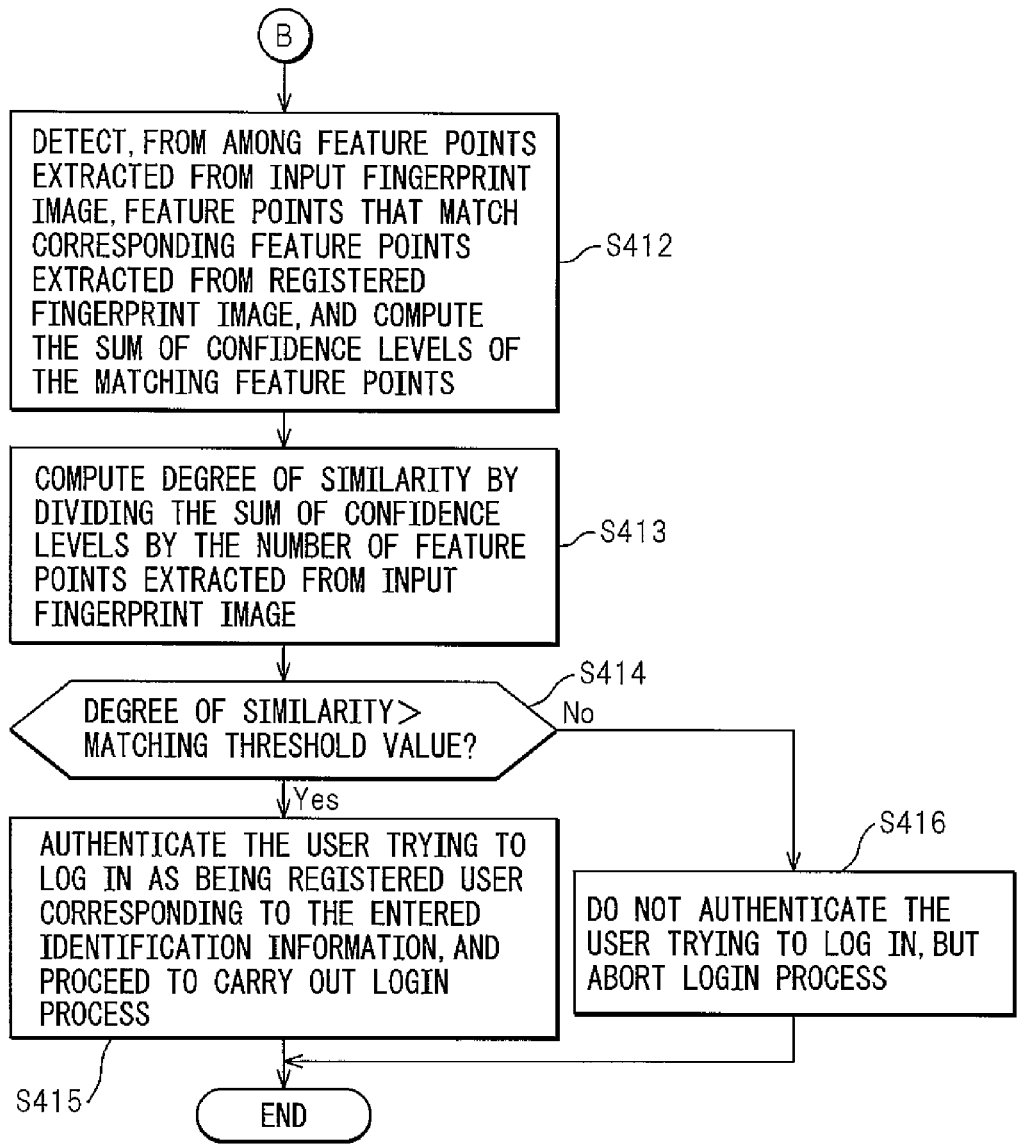
FIG. 8B is an operation flowchart of the alternative example of the biometric authentication process which is controlled by the computer program executed on the processing unit.

FIGS. 7, 8A and 8B illustrate an operation flowchart of an alternative example of a biometric authentication process which is controlled by a computer program executed on the processing unit 6. In this operation flow, the processing unit 6 performs the matching process using minutia matching, and changes the process for the extraction of a feature point according to whether the feature point is contained in any one of the blurred regions.

As illustrated in FIG. 7, when the user makes a login request via the input unit 2, the processing unit 6 starts the biometric authentication process. Then, the processing unit 6 acquires the identification information that the user trying to log in has entered via the input unit 2 (step S401). Further, in accordance with the fingerprint image input process illustrated in FIGS. 4A and 4B, the processing unit 6 acquires as the input fingerprint image the fingerprint image representing the user's fingerprint captured by the biometric information acquiring unit 4 (step S402).

Next, the processing unit 6 retrieves from the storage unit 5 the plurality of feature points extracted in advance as the feature amount from the registered fingerprint image corresponding to the user's identification information entered via the input unit 2 (step S403). Then, the processing unit 6 passes the input fingerprint image to the matching unit 18, together with the plurality of feature points extracted from the registered fingerprint image and the information indicating the highly blurred region and moderately blurred region detected on the input fingerprint image.

The matching unit 18 determines whether any highly blurred region has been detected on the input fingerprint image (step S404). If a highly blurred region has been detected on the input fingerprint image (Yes in step S404), the matching unit 18 excludes the highly blurred region from the entire area of the input fingerprint image, and sets the remaining area as a feature point search area within which the feature point extraction process is performed (step S405). On the other hand, if no highly blurred region has been detected on the input fingerprint image (No in step S404), the matching unit 18 sets the entire area of the input fingerprint image as the feature point search area (step S406).

After step S405 or S406, the matching unit 18 extracts feature points, such as the ridge end points or branch points, from the feature point search area defined on the input fingerprint image (step S407).

As illustrated in FIGS. 8A and 8B, the matching unit 18 determines whether an attention feature point, selected from among the feature points extracted from the input fingerprint image, is contained in the moderately blurred region (step S408). If the attention feature point is not contained in the moderately blurred region (No in step S408), the matching unit 18 sets the confidence level of the attention feature point to a value indicating a high degree of confidence, for example, to 1 (step S409). On the other hand, if the attention feature point is contained in the moderately blurred region (Yes in step S408), the matching unit 18 sets the confidence level of the attention feature point to a value indicating a lower degree of confidence than the confidence level of a feature point not contained in the moderately blurred region, for example, to 0.7 (step S410). After that, the matching unit 18 determines whether the confidence level has been set for all the extracted feature points (step S411). If there is any feature point for which the confidence level has not been set yet (No in step S411), the matching unit 18 takes that feature point as the attention feature point. Then, the matching unit 18 returns control to step S408.

When the confidence level has been set for all the extracted feature points (Yes in step S411), the matching unit 18 performs minutia matching to detect, from among the feature points extracted from the input fingerprint image, the feature points that match the corresponding feature points extracted from the registered fingerprint image. Then, the matching unit 18 computes the sum of the confidence levels that have been set for the matching feature points (step S412). The matching unit 18 then computes the degree of similarity by dividing the sum of the confidence levels by the total number of feature points extracted from the input fingerprint image (step S413). The matching unit 18 passes the thus computed degree of similarity to the authentication judgment unit 19 in the processing unit 6.

The authentication judgment unit 19 determines whether the degree of similarity thus computed is greater than the matching threshold value (step S414). If the degree of similarity is greater than the matching threshold value (Yes in step S414), the authentication judgment unit 19 determines that the input fingerprint matches the registered fingerprint. Then, the authentication judgment unit 19 authenticates the user trying to log in as being the registered user corresponding to the user's identification information entered by that user (step S415). The authentication judgment unit 19 reports the result of the authentication to the processing unit 6. Then, the processing unit 6 proceeds to carry out the login process.

On the other hand, if the degree of similarity is not greater than the matching threshold value (No in step S414), the authentication judgment unit 19 determines that the input fingerprint does not match the registered fingerprint. In this case, the authentication judgment unit 19 does not authenticate the user trying to log in (step S416). The authentication judgment unit 19 reports the result of the authentication to the processing unit 6. Thereupon, the processing unit 6 aborts the login process.

After step S415 or S416, the processing unit 6 terminates the biometric authentication process.

The matching unit 18 may also extract feature points from the highly blurred region. In this case, the above steps S404 and S405 are omitted. Instead, the matching unit 18 performs the same processing as the above steps S408 to S411 on the feature points contained in the highly blurred region. However, in this case, it is preferable that the confidence level of the feature points contained in the highly blurred region is set lower than the confidence level of the feature points contained in the moderately blurred region.

As described above, the computer for carrying out the biometric authentication process according to the one embodiment identifies the cause for the occurrence of a blurred region on the fingerprint image by examining whether a moderately blurred region has been detected within the search area defined adjacent to the highly blurred region. Then, the computer presents a warning message indicating the cause to the user and retries the input of the fingerprint image. Since the computer can thus notify the user of the cause of the blurred region detected on the fingerprint image, the fingerprint image can be reacquired after the user has eliminated the cause. In this way, the computer can reduce the chance that the acquired fingerprint image may contain blurred regions.

Further, the computer detects the highly blurred region, where the ridge/valley contrast is highly blurred, and the moderately blurred region, where the degree of blurring is low, by using different criteria. As a result, the computer can detect highly accurately any region where the ridge/valley contrast is blurred. Furthermore, even if a blurred region is left on the fingerprint image, since the computer can apply a correction by changing the amount of enhancement to be applied to the ridge/valley contrast according to the degree of blurring, the ridges can be enhanced appropriately, while suppressing the generation of artifacts due to the correction. Moreover, since the computer sets the confidence level lower for feature points contained in a region having a higher degree of blurring, the effects that a region having a high degree of blurring will have on the matching process can be reduced accordingly.

The present invention is not limited to the above specific embodiment. For example, when using the computer only for generating the user's fingerprint image for registration, the matching unit and the authentication judgment unit may be omitted from the various functions of the processing unit. On the other hand, when using the computer to perform biometric authentication by using data concerning the fingerprint registered by some other apparatus, the registration processing unit may be omitted. Further, the correction unit may be omitted. Furthermore, the computer may carry out the biometric authentication process at other times than when the user logs in. For example, when the user tries to access a specific memory area in the storage unit or tries to run an application that requires administrator-level permissions, the computer may carry out the biometric authentication process.

Further, the computer may match the input fingerprint represented in the input fingerprint image against the registered fingerprints of all the registered users stored in the storage unit. In this case, the computer determines whether the user is to be authenticated as being the registered user corresponding to the registered fingerprint that has been judged to have the highest degree of similarity as a result of the matching process.

Further, the computer program for causing the computer to implement all or some of the functions of the processing unit in each embodiment may be provided in the form of a recording medium readable by the computer.

The biometric authentication device and the biometric authentication method disclosed in this specification are also applicable to various kinds of apparatus or systems that perform biometric authentication between user biometric information and preregistered biometric information in order to permit the user to perform a given operation. Such apparatus or systems include, for example, a computer system in which one or more terminals are connected to a server via a communication network, or an automated teller machine system (ATM system) or the like. In this case, each terminal is equipped with a biometric information acquiring unit, and the biometric image acquired by the biometric information acquiring unit is transmitted to the server. Then, the server carries out the biometric image registration or biometric authentication process by implementing the functions of the processing unit according to the above embodiment. Alternatively, a processing unit of a portable memory device constructed by combining a biometric information acquiring unit, storage unit, processing unit, and a data transfer interface conforming to a standard such as Universal Serial Bus into one unit may be provided with the various functions of the processing unit of the computer according to the above embodiment.

All of the examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiments of the present invention have been described in detail, it should be understood that the various changes, substitutions, and alterations could be made hereto without departing from the spirit and scope of the invention.

What is claimed is:

1. A biometric authentication device comprising:
a biometric information acquiring unit which acquires a user's input biometric information and generates an input biometric image representing said input biometric information;
a storage unit which stores data concerning registered biometric information of at least one registered user that is preregistered; and
a processing unit,
wherein said processing unit implements:
a moderately blurred region detection function which detects from said input biometric image a moderately blurred region having a first degree of blurring;
a highly blurred region detection function which detects from said input biometric image a highly blurred region having a second degree of blurring which is higher than said first degree of blurring;
a blurring cause identifying function which, when said highly blurred region is detected and when said moderately blurred region is detected within a search area defined adjacent to said highly blurred region, then determines that said highly blurred region and said moderately blurred region have occurred due to a first cause and which, when said highly blurred region is detected and when said moderately blurred region is detected outside said search area, or when only one or the other of said highly blurred region and said moderately blurred region is detected, then determines that said highly blurred region or said moderately blurred region has occurred due to a second cause which is different from said first cause;
a warning processing function which presents to said user a warning message which is different between said first cause and said second cause; and a matching function which, when at least one or the other of said highly blurred region and said moderately blurred region is detected from said input biometric image initially acquired, then matches said input biometric information represented in said input biometric image against said registered biometric information after said input biometric image has been regenerated by said biometric information acquiring unit reacquiring said user's biometric information in response to said warning message.

2. The biometric authentication device according to claim 1, wherein said processing unit further implements a feature amount extraction function which extracts from said input biometric image a plurality of input feature points representing features of said input biometric information, and wherein said storage unit stores, as said data concerning said registered biometric information of said registered user, a plurality of registered feature points representing features of said registered biometric information, and said matching function matches said input biometric information against said registered biometric information, based on a sum of confidence levels assigned to said input feature points that are detected, from among said plurality of input feature points extracted from said input fingerprint image, as matching corresponding ones of said plurality of registered feature points, wherein any input feature point contained in said moderately blurred region is assigned a first confidence level which is set higher than a second confidence level assigned to any input feature point contained in said highly blurred region.

3. The biometric authentication device according to claim 1, wherein said processing unit further implements a feature amount extraction function which extracts, from an area defined by excluding said highly blurred region from said input biometric image, a plurality of input feature points representing features of said input biometric information, and wherein said storage unit stores, as said data representing said registered biometric information of said registered user, a plurality of registered feature points representing features of said registered biometric information, and said matching function matches said input biometric information against said registered biometric information, based on a sum of confidence levels assigned to said input feature points that are detected, from among said plurality of input feature points, as matching corresponding ones of said plurality of registered feature points, wherein any input feature point contained in said moderately blurred region is assigned a first confidence level which is set lower than a third confidence level assigned to any input feature point contained in an area other than said highly blurred region and said moderately blurred region.

4. The biometric authentication device according to claim 1, wherein said biometric information is a fingerprint or a palm print, and said biometric information acquiring unit is a sweep-type sensor which acquires said biometric information by moving said user's part corresponding to said biometric information in sliding fashion relative to said biometric information acquiring unit, and wherein said blurring cause identifying function makes said search area larger in size along a direction of said sliding as the angle that a ridge direction near said highly blurred region makes with the direction of said sliding becomes smaller.

5. The biometric authentication device according to claim 1, wherein said first cause is adhesion of a liquid to said user's part corresponding to said biometric information or secretion of a liquid from said part, and wherein said warning processing function presents to said user a warning message indicating that a liquid is adhering to said user's part corresponding to said biometric information.

6. The biometric authentication device according to claim 1, wherein said second cause is excessive pressing of said user's part corresponding to said biometric information on said biometric information acquiring unit, and wherein said warning processing function presents to said user a warning message indicating that said user's part corresponding to said biometric information is excessively pressed on said biometric information acquiring unit.

7. A non-transitory computer readable recording medium having a computer program for causing a device to perform biometric authentication using a user's input biometric information and registered biometric information of a registered user, said device comprising a biometric information acquiring unit which acquires said input biometric information and generates an input biometric image representing said input biometric information, a storage unit which stores data concerning said registered biometric information, and a processing unit, wherein said computer program causes said processing unit to execute:

detecting from said input biometric image a moderately blurred region having a first degree of blurring;

detecting from said input biometric image a highly blurred region having a second degree of blurring which is higher than said first degree of blurring;

when said highly blurred region is detected and when said moderately blurred region is detected within a search area defined adjacent to said highly blurred region, then determining that said highly blurred region and said moderately blurred region have occurred due to a first cause, while on the other hand, when said highly blurred region is detected and when said moderately blurred region is detected outside said search area, or when only one or the other of said highly blurred region and said moderately blurred region is detected, then determining that said highly blurred region or said moderately blurred region has occurred due to a second cause which is different from said first cause;

presenting to said user a warning message which is different between said first cause and said second cause; and when at least one or the other of said highly blurred region and said moderately blurred region is detected from said input biometric image initially acquired, then matching said input biometric information represented in said input biometric image against said registered biometric information after said input biometric image has been regenerated by said biometric information acquiring unit reacquiring said user's biometric information in response to said warning message.

8. A biometric authentication method for performing biometric authentication using a user's input biometric information and registered biometric information of a registered user in a device comprising a biometric information acquiring unit which acquires said input biometric information and generates an input biometric image representing said input biometric information and a storage unit which stores data concerning said registered biometric information, comprising:

detecting from said input biometric image a moderately blurred region having a first degree of blurring;

detecting from said input biometric image a highly blurred region having a second degree of blurring which is higher than said first degree of blurring;

when said highly blurred region is detected and when said moderately blurred region is detected within a search area defined adjacent to said highly blurred region, then determining that said highly blurred region and said moderately blurred region have occurred due to a first cause, while on the other hand, when said highly blurred region is detected and when said moderately blurred region is detected outside said search area, or when only one or the other of said highly blurred region and said moderately blurred region is detected, then determining that said highly blurred region or said moderately blurred region has occurred due to a second cause which is different from said first cause;

presenting to said user a warning message which is different between said first cause and said second cause; and when at least one or the other of said highly blurred region and said moderately blurred region is detected from said input biometric image initially acquired, then matching said input biometric information represented in said input biometric image against said registered biometric information after said input biometric image has been regenerated by said biometric information acquiring unit reacquiring said user's biometric information in response to said warning message.

* * * * *